US009457551B2

(12) United States Patent
Tsai et al.

(10) Patent No.: US 9,457,551 B2
(45) Date of Patent: Oct. 4, 2016

(54) METHOD FOR MANUFACTURING DISPLAY

(71) Applicants: INNOCOM TECHNOLOGY (SHENZHEN) CO., LTD., Shenzhen, Guangdong Province (CN); INNOLUX CORPORATION, Chu-Nan, Miao-Li County (TW)

(72) Inventors: Chi-Che Tsai, Chu-Nan (TW); Po-Ching Lin, Chu-Nan (TW); Cheng-Ta Chen, Chu-Nan (TW); Cheng-Chung Chiang, Chu-Nan (TW); Wei-Yen Wu, Chu-Nan (TW); Yen-Hui Wu, Chu-Nan (TW)

(73) Assignees: INNOCOM TECHNOLOGY (SHENZHEN) CO., LTD., Shenzhen (CN); INNOLUX CORPORATION, Jhu-Nan (TW)

( * ) Notice: Subject to any disclaimer, the term of this patent is extended or adjusted under 35 U.S.C. 154(b) by 15 days.

(21) Appl. No.: 14/670,305

(22) Filed: Mar. 26, 2015

(65) Prior Publication Data
US 2015/0197077 A1    Jul. 16, 2015

Related U.S. Application Data

(62) Division of application No. 13/402,795, filed on Feb. 22, 2012, now abandoned.

(30) Foreign Application Priority Data

Feb. 25, 2011  (TW) .............................. 100106504 A

(51) Int. Cl.
| | |
|---|---|
| *B32B 37/26* | (2006.01) |
| *B32B 37/12* | (2006.01) |
| *B32B 38/10* | (2006.01) |
| *G02F 1/1333* | (2006.01) |
| *G02F 1/335* | (2006.01) |
| *G02F 1/167* | (2006.01) |
| *B32B 43/00* | (2006.01) |
| *B32B 37/18* | (2006.01) |

(Continued)

(52) U.S. Cl.
CPC ............... *B32B 37/26* (2013.01); *B32B 37/12* (2013.01); *B32B 37/18* (2013.01); *B32B 38/10* (2013.01);
(Continued)

(58) Field of Classification Search
CPC .................. B32B 2037/268; B32B 2307/546; B32B 2307/748; B32B 2457/20; B32B 37/12; B32B 37/18; B32B 37/26; B32B 38/10; B32B 38/1858; B32B 43/006; B32B 7/06; G02F 1/1333; G02F 1/133305; G02F 1/133514; G02F 1/167; G02F 2201/50; B29K 2105/0079
USPC ......................... 428/1.61; 156/235, 247, 289
See application file for complete search history.

(56) References Cited

U.S. PATENT DOCUMENTS 4,387,133 A * 6/1983 Ichikawa ................ B32B 27/08
349/122

(Continued)

FOREIGN PATENT DOCUMENTS

| CN | 1617635 | 5/2005 |
|---|---|---|
| CN | 101794538 | 8/2010 |

(Continued)

*Primary Examiner* — Sonya Mazumdar
(74) *Attorney, Agent, or Firm* — Liu & Liu

(57) ABSTRACT

A method for manufacturing a display is provided. A display including a supporting layer, a flexible layer and a display structure is provided. The display structure has a top side and a bottom side which are opposite to each other. One of the supporting layer and the flexible layer is disposed at the bottom side of the display structure, and the other one of the supporting layer and the flexible layer is disposed at the top side or the bottom side of the display structure. When the supporting layer and the flexible layer are both disposed at the bottom side of the display structure, the flexible layer is located between the supporting layer and the display structure.

9 Claims, 23 Drawing Sheets

(51) Int. Cl.
 *B29K 105/00* (2006.01)
 *B32B 7/06* (2006.01)
 *B32B 38/18* (2006.01)
 *G02F 1/1335* (2006.01)

(52) U.S. Cl.
 CPC ........... B32B 43/006 (2013.01); G02F 1/1333 (2013.01); G02F 1/133305 (2013.01); G02F 1/167 (2013.01); *B29K 2105/0079* (2013.01); *B32B 7/06* (2013.01); *B32B 38/1858* (2013.01); *B32B 2037/268* (2013.01); *B32B 2307/546* (2013.01); *B32B 2307/748* (2013.01); *B32B 2457/20* (2013.01); *G02F 1/133514* (2013.01); *G02F 2201/50* (2013.01)

(56) References Cited

U.S. PATENT DOCUMENTS

| | | | |
|---|---|---|---|
| 5,817,550 A | 10/1998 | Carey et al. | |
| 7,208,206 B2 * | 4/2007 | Hieda | B32B 23/08 349/122 |
| 2002/0192440 A1 * | 12/2002 | Fields | B32B 27/08 428/209 |
| 2003/0082314 A1 * | 5/2003 | Higashi | G02F 1/133555 428/1.31 |
| 2004/0180148 A1 * | 9/2004 | Hieda | B32B 23/08 428/1.1 |
| 2009/0142517 A1 * | 6/2009 | Takeko | C09J 7/0296 428/1.31 |
| 2009/0266471 A1 * | 10/2009 | Kim | G02F 1/133305 156/67 |
| 2010/0209630 A1 * | 8/2010 | Watanabe | C08J 5/18 428/1.31 |
| 2011/0061801 A1 * | 3/2011 | Kitada | B32B 37/182 156/247 |

FOREIGN PATENT DOCUMENTS

| | | |
|---|---|---|
| TW | 200717808 | 5/2007 |
| TW | 201011427 | 3/2010 |
| TW | 201025515 | 7/2010 |
| TW | 201030693 | 8/2010 |

* cited by examiner

METHOD FOR MANUFACTURING DISPLAY

This application is a divisional application of application Ser. No. 13/402,795, filed Feb. 22, 2012, which claims the benefit of Taiwan application Serial No. 100106504, filed Feb. 25, 2011, the subject matter of which is incorporated herein by reference.

BACKGROUND OF THE INVENTION

1. Field of the Invention

The invention relates in general to a display and a method for manufacturing the same, and more particularly to a display with a supporting structure and a method for manufacturing the same.

2. Description of the Related Art

The rapid advance in display technology has improved the specification of the display and boosts consumers' interest and willingness for using the display. For example, the thin-type display having the features of thin thickness and light weight has gained great popularity. Since the display adopts a glass substrate mostly, in the development of thin-type display, the overall weight and thickness of the display are normally reduced by thinning the glass substrate.

The glass substrate is currently thinned by way of chemical etching or grinding. However, the two methods often increase failure rate and manufacturing cost. In addition, the glass substrate disadvantaged by fragility and poor bending which would deteriorate the yield rate of the display. Therefore, the manufacturers are aiming at replacing the glass substrate with a substrate made of other materials.

Currently, some display replaces the glass substrate with a plastic substrate. However, under the current trend of large-sized display, the plastic substrate is subjected to factors such as collision, pressure, deflection, vibration, contamination or static electricity in the course of delivering, retaining, storage or cleaning. Moreover, the plastic substrate being too soft may be scratched or end up with aging during the reliability test.

SUMMARY OF THE INVENTION

The invention is directed to a display and a method for manufacturing the same. During the manufacturing process, the upper structure and the lower structure are assembled with higher alignment accuracy through the disposition of the carrying layer to increase the yield rate of the product. Besides, the supporting layer enhances the stiffness of the display, so that the display which is capable of slightly bending is drop-resistant.

According to an aspect of the invention, a display including a first supporting layer, a first flexible layer and a first display structure is provided. The first display structure has a top side and a bottom side which are opposite to each other. One of the first supporting layer and the first flexible layer is disposed at the bottom side of the first display structure, and the other one of the first supporting layer and the first flexible layer is disposed at the top side or the bottom side of the first display structure. When the first supporting layer and the first flexible layer are both disposed at the bottom side of the first display structure, the first flexible layer is located between the first supporting layer and the first display structure.

According to another aspect of the invention, a method for manufacturing a display is provided. The method includes the following steps: A first to-be-released structure is provided, wherein the first to-be-released structure includes a first carrying layer, a first release layer, a first flexible layer and a first display structure which are sequentially stacked together. At least the first carrying layer is separated from the first to-be-released structure to form a first to-be-bonded structure. The first to-be-bonded structure is bonded on a first supporting layer of a second carrying layer, a first separation layer and the first supporting layer which are sequentially stacked together to form a first laminated structure. The first laminated structure at least includes the first supporting layer, the first flexible layer and the first display structure which are sequentially stacked together. A second laminated structure is provided, wherein the second laminated structure at least includes a second supporting layer and a second display structure which are sequentially stacked together. The first laminated structure and the second laminated structure are bonded together.

The above and other aspects of the invention will become better understood with regard to the following detailed description of the preferred but non-limiting embodiment(s). The following description is made with reference to the accompanying drawings.

DETAILED DESCRIPTION OF THE INVENTION

A display according to an embodiment of the invention includes a supporting layer, a flexible layer and a display structure. The display structure has a top side and a bottom side which are opposite to each other. One of the supporting layer and the flexible layer is disposed at the bottom side of the display structure, and the other one of the supporting layer and the flexible layer is disposed at the top side or the bottom side of the display structure. When the supporting layer and the flexible layer are both disposed at the bottom side of the display structure, the flexible layer is located between the supporting layer and the display structure. Thus, an upper structure and a lower structure of the display are assembled with higher alignment accuracy through the disposition of the supporting layer, and the display which is capable of slightly bending is drop-resistant.

Figure 1:
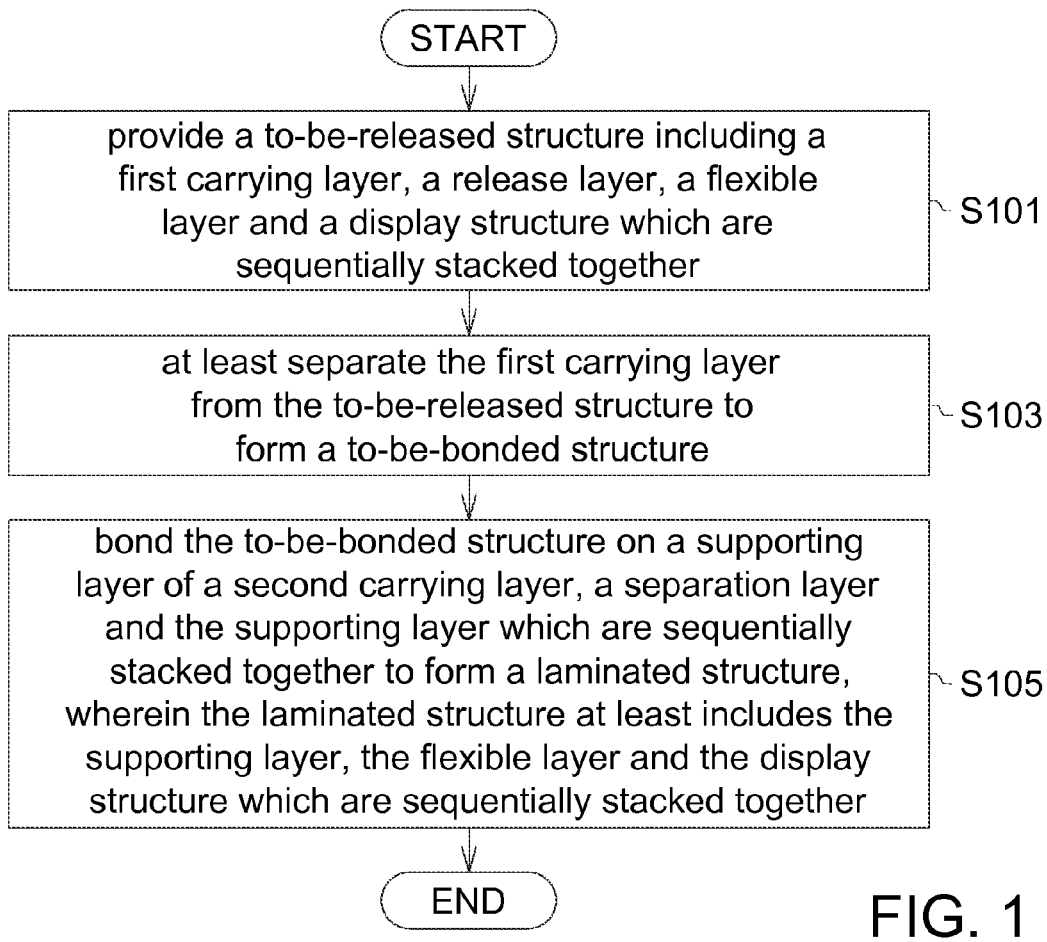
FIG. 1 shows a flowchart of a method for manufacturing a display according to an embodiment of the invention.
Figure 2A:
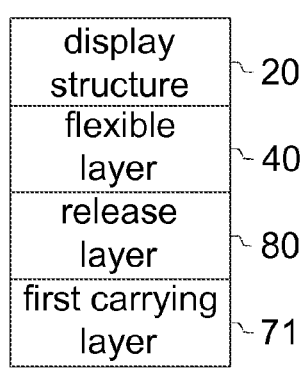
FIGS. 2A~2C are processes of the method for manufacturing the display according to the embodiment of the invention.
Figure 2B:
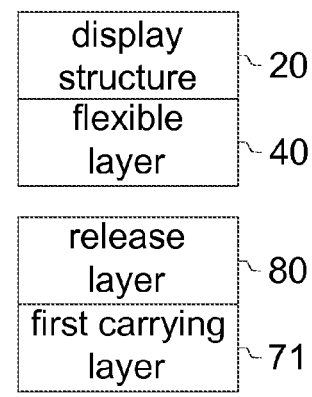
Figure 2C:
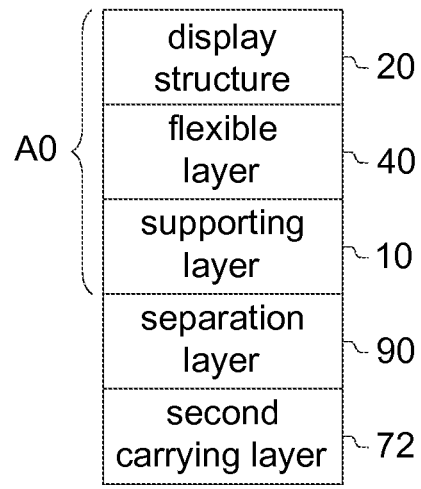

According to an embodiment of the invention, a partial structure of the display can be manufactured through steps illustrated in FIG. 1 and FIGS. 2A~2C. Referring to FIG. 1 and FIGS. 2A~2C, a flowchart of a method for manufacturing a display according to an embodiment of the invention is shown in FIG. 1, and processes of the method for manufacturing the display according to the embodiment of the invention are shown in FIGS. 2A~2C.

In step S101, a to-be-released structure is provided, as indicated in FIG. 2A. The to-be-released structure includes a first carrying layer 71, a release layer 80, a flexible layer 40 and a display structure 20 which are sequentially stacked together. The coefficient of thermal expansion (CTE) of the first carrying layer 71 is close or identical to that of the flexible layer 40, for example, to reduce or avoid the first carrying layer 71 and the flexible layer 40 being warped during the heating process due to the difference in the CTE.

Next, in step S103, at least the first carrying layer 71 is separated from the to-be-released structure in FIG. 2A to form a to-be-bonded structure, as indicated in FIG. 2B. The present step is exemplified by the arrangement that the first carrying layer 71 and the release layer 80 are separated from the to-be-released structure, so the to-be-bonded structure includes the display structure 20 and the flexible layer 40.

Then, in step S105, the to-be-bonded structure is bonded on a supporting layer 10 of a second carrying layer 72, a separation layer 90 and the supporting layer 10 which are sequentially stacked together to form a laminated structure A0, as indicated in FIG. 2C. The laminated structure A0 includes the supporting layer 10, the flexible layer 40 and the display structure 20 which are sequentially stacked together.

The display structure 20 can be realized by a structure including an organic light emitting diode (OLED) and several active/passive elements, or a structure including an electro-phoretic display (EPD) and several active/passive elements, so that the laminated structure A0 can be directly used as a display for displaying black/white frames. The active elements can be realized by thin film transistors (TFTs), for example. If the display structure 20 further includes a color photoresist layer, then the laminated structure A0 can be used as a display for displaying color frames. If the display structure 20 further includes a touch module or a 3D module, then the laminated structure A0 can be used as a touch display or a 3D display.

Alternatively, the display structure 20 can be realized by a color photoresist layer, an electro-phoretic display or several active/passive elements, for example, so that the laminated structure A0 can be used as an upper structure or a lower structure of the display.

In addition, step S103 is exemplified by the arrangement that the first carrying layer 71 and the release layer 80 are separated from the to-be-released structure. In other embodiments, step S103 can be exemplified by the arrangement that only the first carrying layer 71 is separated from the to-be-released structure, so that the to-be-bonded structure includes the display structure 20, the flexible layer 40 and the release layer 80.

The details of the invention are elaborated by the following embodiments.

First Embodiment

Figure 3:
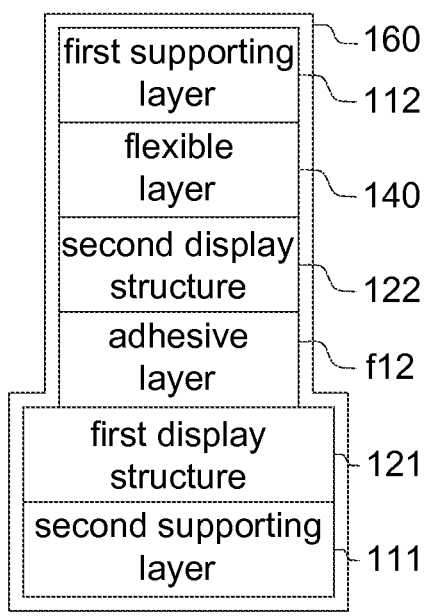
FIG. 3 shows a display according to a first embodiment of the invention.

Referring to FIG. 3, a display according to a first embodiment of the invention is shown. The display 100 includes a second supporting layer 111, a first supporting layer 112, two display structures 121 and 122, a flexible layer 140, a protection layer 160 and an adhesive layer f12.

The second supporting layer 111, the display structure 121, the adhesive layer f12, the display structure 122, the flexible layer 140 and the first supporting layer 112 are sequentially staked together. The protection layer 160 at least covers the peripherals of the display structures 121 and 122, the flexible layer 140 and the adhesive layer f12. The present embodiment of the invention is exemplified by the arrangement that the protection layer 160 completely covers the second supporting layer 111, the display structure 121, the adhesive layer f12, the display structure 122, the flexible layer 140 and the first supporting layer 112.

A substrate adopted by a conventional display may often be deformed or scratched during the reliability test or due to other external factors. Furthermore, the water/oxygen resistance of the substrate is limited to the characteristics of substrate material. In the present embodiment of the invention, the protection layer 160 is made from a high polymer material such as a release material, an adhesive or a photoresist material. The release material can be realized by an acrylic-type material or a silicone-type material, for example. The adhesive can be realized by a pressure sensitive adhesive (PSA) or an optical clear adhesive (OCA), for example. The photoresist material can be realized by novolak, acrylate or epoxy, for example. Through the disposition of the protection layer 160, the display 100 can effectively reduce the occurrences of deformation and scratches and enhance water/oxygen resistance.

In the present embodiment of the invention, the second supporting layer 111 can be, for example, formed by metal, glass, reinforced glass or plastic, and the first supporting layer 112 can be, for example, formed by plastic, glass or reinforced glass. The display structure 122 can be, for example, realized by a color photoresist layer. Also, the display structure 121 can be realized by a structure including an organic light emitting diode and several active/passive elements, or a structure including an electro-phoretic display and several active/passive elements. The active elements can be realized by such as TFTs.

Figure 4:
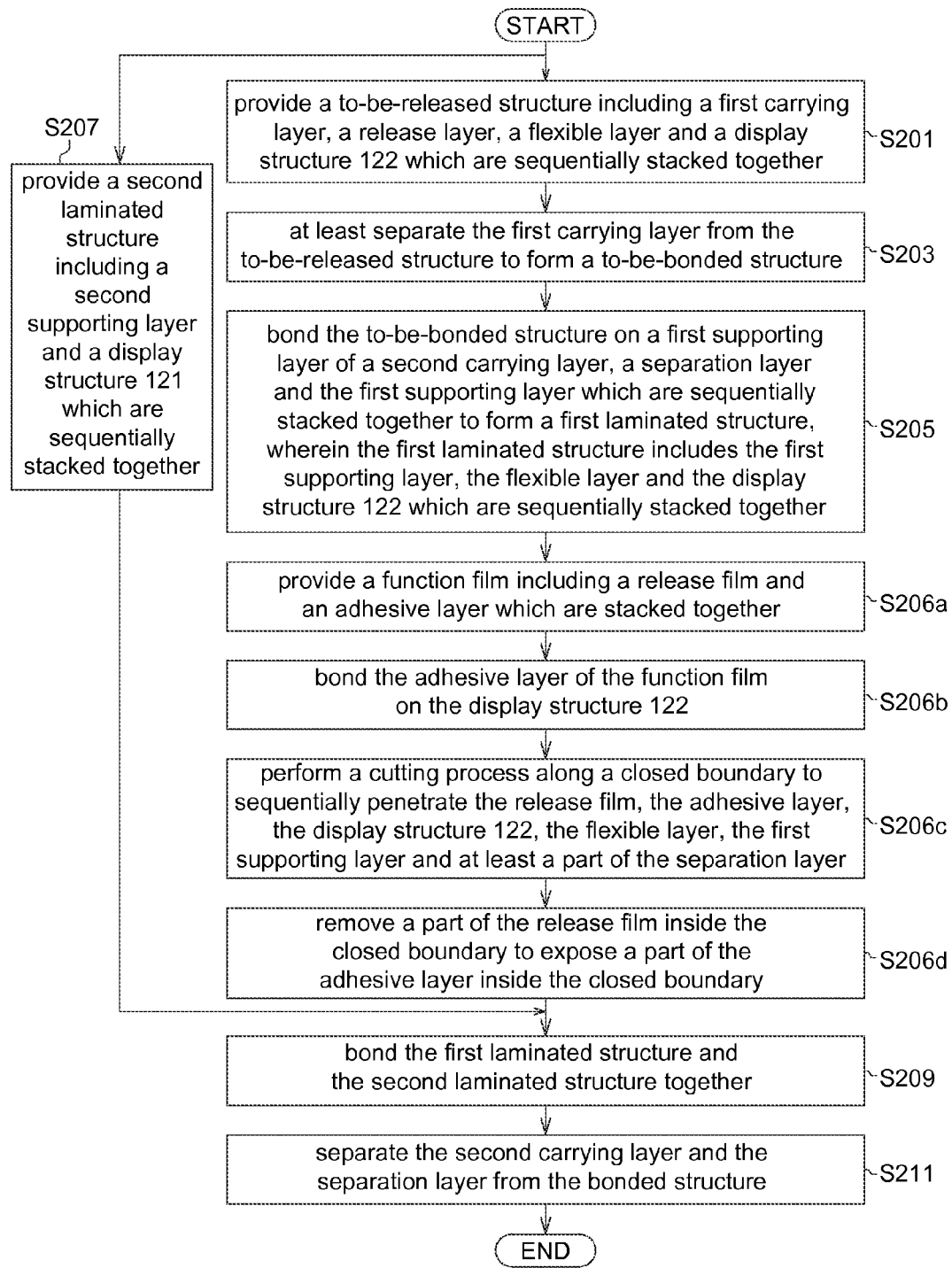
FIG. 4 shows a flowchart of a method for manufacturing the display according to the first embodiment of the invention.

Regardless the display structure 121 is a structure including an organic light emitting diode and several active/passive elements or a structure including an electro-phoretic display and several active/passive elements, the display 100 can be manufactured according to the processes illustrated in FIG. 4 and FIGS. 5A~5J. Steps S201~5205 in FIG. 4 are similar to steps S101~5105 in FIG. 1. That is, steps S101~5105 in FIG. 1 are used for manufacturing the upper structure of the display 100 of the present embodiment of the invention.

Referring to FIG. 4 and FIGS. 5A~5J, a flowchart of a method for manufacturing the display according to the first embodiment of the invention is shown in FIG. 4, and processes of the method for manufacturing the display according to the first embodiment of the invention are shown in FIGS. 5A~5J.

In the present embodiment of the invention, the upper structure of the display 100 is manufactured according to steps S201~S206d, and the lower structure of the display 100 is manufactured according to step S207. Afterwards, the display 100 of the present embodiment of the invention can be formed through the bonding (assembling) step as illustrated in S209. The organic light emitting diode or the electro-phoretic display is located in the lower structure of the display 100.

Figure 5A:
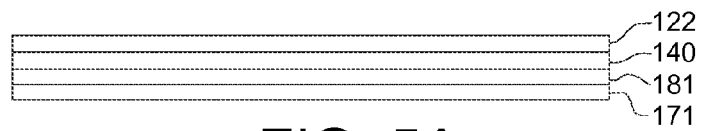
FIGS. 5A~5J are processes of the method for manufacturing the display according to the first embodiment of the invention.

Firstly, in step S201, a to-be-released structure is provided, as indicated in FIG. 5A. The to-be-released structure includes a first carrying layer 171, a release layer 181, the flexible layer 140 and the display structure 122 which are sequentially stacked together.

Figure 5B:
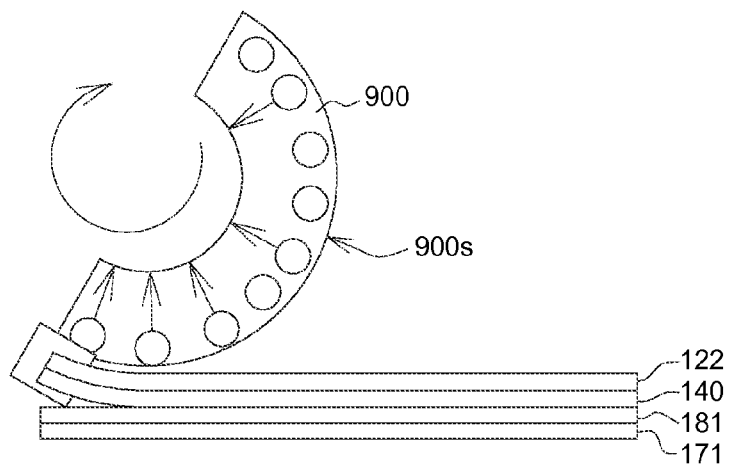

Then, in step S203, at least the first carrying layer 171 is separated from the to-be-released structure in FIG. 5A to form a to-be-bonded structure, as indicated in FIG. 5B. The present step is exemplified by the arrangement that the first carrying layer 171 and the release layer 181 are separated from the to-be-released structure, so the to-be-bonded structure includes the display structure 122 and the flexible layer 140. Step S203 of the present embodiment of the invention is exemplified by the arrangement that the first carrying layer 171 and the release layer 181 are separated from the to-be-released structure by a release adhesive mechanism 900. Firstly, one side of the flexible layer 140 and one side of the display structure 122 are grabbed by the release adhesive mechanism 900 by way of clamping, adhering, vacuum electrostatic suction, or van der Waals' forces formed from polyimide nanostructure or silicon nanostructure. Next, the first carrying layer 171 and the release layer 181 are fixed by way of vacuum suction or by a clamper. Then, the release adhesive mechanism 900 is rotated, and the flexible layer 140 and the display structure 122 are sucked together by the release adhesive mechanism 900 by way of vacuum suction, electrostatic suction, adhesive roller adhesion or a combination thereof, so that the flexible layer 140 and display structure 122 are bonded on a surface 900s of the release adhesive mechanism 900 and the first carrying layer 171 and the release layer 181 are separated from the to-be-released structure. Here, the surface 900s of the release adhesive mechanism 900 can be realized by a curved surface, for example. For convenient cleaning and changing, the release adhesive mechanism 900 can suck the first carrying layer 171 and the release layer 181 entirely or partially. Moreover, a strong adhesive element, a clip, or a bump can be disposed at the front end of the release adhesive mechanism 900 for helping to separate the first carrying layer 171 and the release layer 181 at the beginning of this process.

Figure 5C:
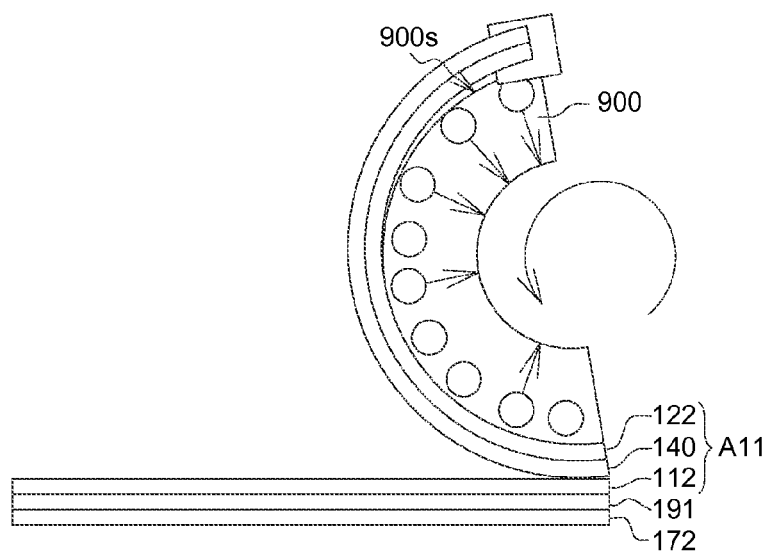

Then, in step S205, the to-be-bonded structure is bonded on the first supporting layer 112 of a second carrying layer 172, a separation layer 191 and the first supporting layer 112 which are sequentially stacked together to form a first laminated structure A11, as indicated in FIG. 5C. The first laminated structure A11 includes the first supporting layer 112, the flexible layer 140 and the display structure 122 which are sequentially stacked together. In step S105, the elements can be bonded by the release adhesive mechanism 900 as well. After step S203, the flexible layer 140 and the display structure 122 are bonded on the surface 900s of the release adhesive mechanism 900. Thus, after the release adhesive mechanism 900 carrying the flexible layer 140 and the display structure 122 is inversely rotated on the first supporting layer 112, the flexible layer 140 can be bonded on the first supporting layer 112 to form a first laminated structure A11.

Figure 5D:
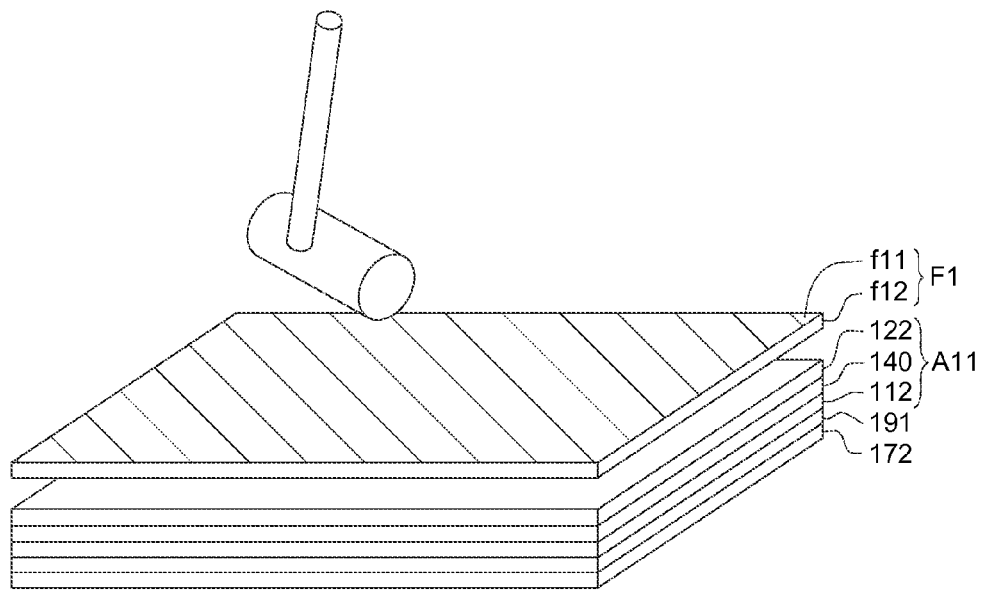

Then, in step S206a, a function film F1 is provided, as indicated in FIG. 5D. The function film F1 includes a release film f11 and an adhesive layer f12 which are stacked together.

Figure 5E:
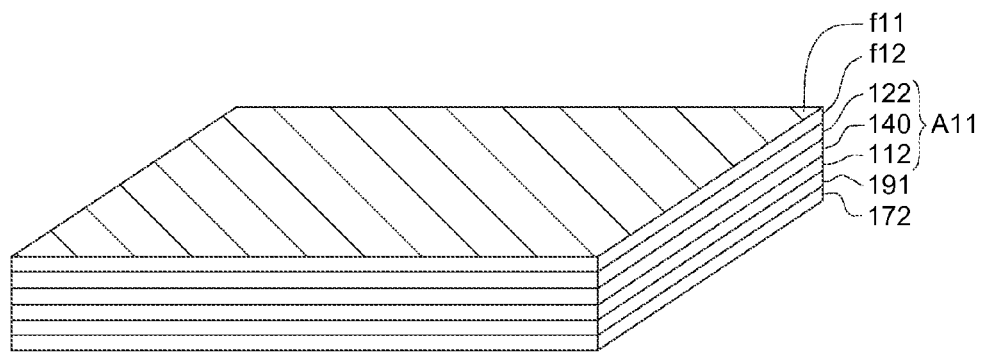
Figure 5F:
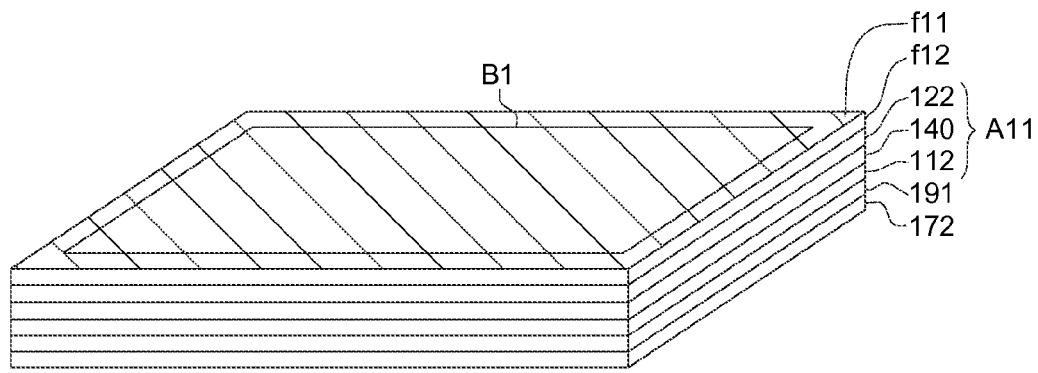

Then, in step S206b, the adhesive layer f12 of the function film F1 is bonded on the display structure 122, as indicated in FIG. 5E.

Then, in step S206c, a cutting process is performed on the structure shown in FIG. 5E along a closed boundary B1 so as to sequentially penetrate the release film f11, the adhesive layer f12, the display structure 122, the flexible layer 140, the first supporting layer 112 and at least a part of the separation layer 191. Here, the cutting process can be implemented by way of laser cutting or punching.

Figure 5G:
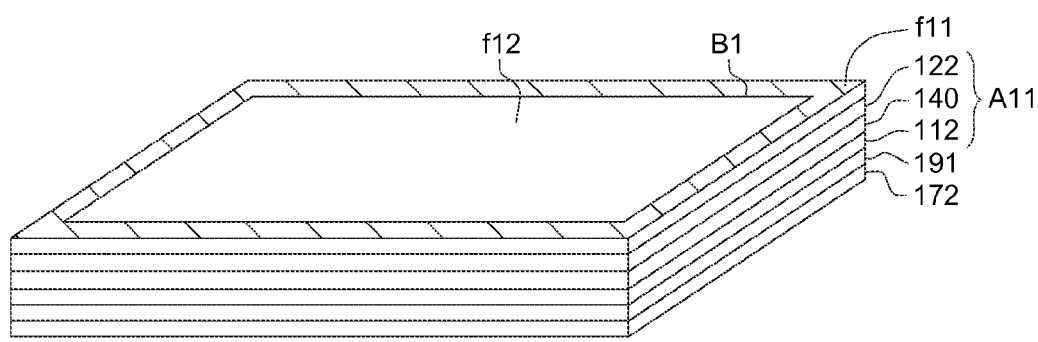

Then, in step S206d, a part of the release film f11 inside the closed boundary B1 is removed to expose a part of the adhesive layer f12 inside the closed boundary B1, as indicated in FIG. 5G.

Figure 5H:

Then, in step S207, a second laminated structure A12 is provided, as indicated in FIG. 5H. The second laminated structure A12 includes the second supporting layer 111 and the display structure 121 which are sequentially stacked together.

Figure 5I:

Then, in step S209, the first laminated structure A11 and the second laminated structure A12 are bonded together, as indicated in FIG. 5I. The first laminated structure A11 is bonded on the second laminated structure A12 through the exposed part of the adhesive layer f12 to avoid the traces distributed on the peripheral of the second laminated structure A12 being damaged when adhered by the adhesive layer f12. Since the first laminated structure A11 and the second carrying layer 172 are stacked together, the first supporting layer 112 which is more stiffness than the flexible layer 140 is included in the first laminated structure A11, and the second laminated structure A12 includes the second supporting layer 111, the sufficient support is provided by the second carrying layer 172, the first supporting layer 112 and the second supporting layer 111 during the bonding and assembling processes. Therefore, the alignment accuracy of the first laminated structure A11 and the second laminated structure A12 is higher than that of the structure which has a soft board only.

Figure 5J:
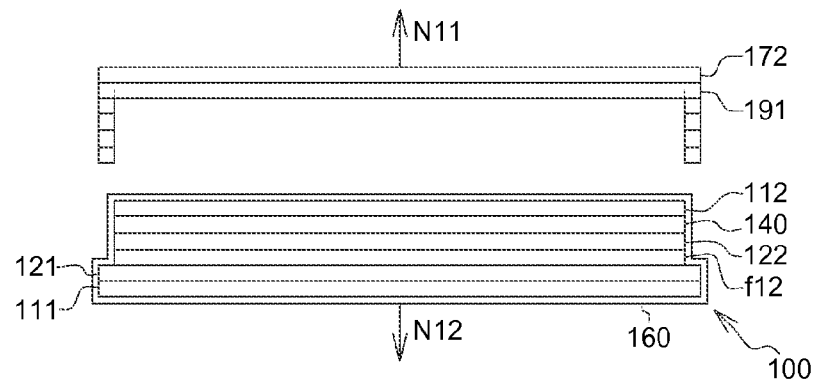

Then, in step S211, the second carrying layer 172 and the separation layer 191 are separated from the bonded structure, as indicated in FIG. 5J. In step S211 of the present embodiment of the invention, the separation layer 191 and the second carrying layer 172 are separated from the first laminated structure A11 by heating the separation layer 191 and respectively applying two forces N11 and N12 to the structures disposed on two opposite sides of the separation layer 191. Furthermore, the separation layer 191 includes a carrying board, a low-adhesive and reworkable adhesive, a base material and a foaming glue layer which are sequentially stacked. The low-adhesive and reworkable adhesive can be, for example, realized by silicone-type adhesive which can be repeatedly used for adhering purpose. The adhesion of the low-adhesive and reworkable adhesive is within an applicable range to avoid the structure being split and remove from the carrying board easily in the manufacturing process, so that the carrying board can be reworkable and recyclable. The foaming glue layer can be formed by adding an adhesive, a viscosity agent, a filler or an antioxidant to a pressure sensitive adhesive (a polymer-based agent) and thermo-expandable microspheres. The pressure sensitive adhesive (a polymer-based agent) can be realized by rubber or an acrylic-type pressure sensitive adhesive, for example. The thermo-expandable microspheres can be, for example, realized by elastic spheres filled with a substance which is easily gasified when being heated. The spheres can be formed by acrylonitrile or vinyl alcohol copolymer, for example. Alternatively, the spheres can be realized by the Matsumoto micropearl that are available in the market. The substance, which is easily gasified when being heated, can be realized by propane or pentane, for example. In step S211, by heating the separation layer 191, the substance, which is easily gasified when being heated and is disposed in the thermo-expandable microspheres of the separation layer 191, is gasified so that the thermo-expandable microspheres are expanded. Afterwards, the force N11 is applied to the second carrying layer 172 (the structure on one side of the separation layer 191), and the force N12 is applied to the first supporting layer 112, the flexible layer 140, the display structure 122, the adhesive layer f12, the display structure 121 and the second supporting layer 111 (the structure on the other side of the separation layer 191). As the adhesion density of the foaming glue layer of the separation layer 191 reduces when the foaming glue layer is heated, the separation layer 191 and the second carrying layer 172 are separated from the bonded structure shown in FIG. 5I. Since the second carrying layer 172, the first supporting layer 112 and the second supporting layer 111 have a certain level of stiffness, the step of separating the separation layer 191 and the second carrying layer 172 from the bonded structure can be separated in a straight up and straight down direction. That is, the separation layer 191 and the second carrying layer 172 can be moved along the direction of the force N12, and the first supporting layer 112, the flexible layer 140, the display structure 122, the adhesive layer f12, the display structure 121 and the second supporting layer 111 can be moved along the direction of the force N11, so that the two blocks can be separated from each other.

Then, the protection layer 160 covers the peripheral of the structure without the separation layer 191 and the second carrying layer 172 to complete the display 100.

In an embodiment, the material of the protection layer 160 can be the same with the material of one of the second supporting layer 111 and the first supporting layer 112, and can be realized by plastic, for example. That is, if the protection layer 160 and the first supporting layer 112 are formed by the same material, then the protection layer 160 and the first supporting layer 112 together can provide protection. If the protection layer 160 and the second supporting layer 111 are formed by the same material, then the protection layer 160 and the second supporting layer 111 together can provide protection.

The material of the separation layer 191 can be, for example, realized by a thermosensitive encapsulant whose adhesion can be changed by adjusting the temperature. When the separation layer 191 is formed by thermosensitive encapsulant, in step S211, the adhesion of the separation layer 191 can be reduced by adjusting the temperature for the separation layer 191 and the second carrying layer 172 to be separated from the bonded structure. Alternatively, the separation layer 191 can be, for example, formed by photosensitive encapsulant for the separation layer 191 and the second carrying layer 172 to be separated from the structure, wherein after the photosensitive encapsulant is radiated by an ultra-velvet light (UV light), the photosensitive encapsulant may shrink or the chemical bond of the photosensitive encapsulant may be broken or changed.

Second Embodiment

Figure 6:
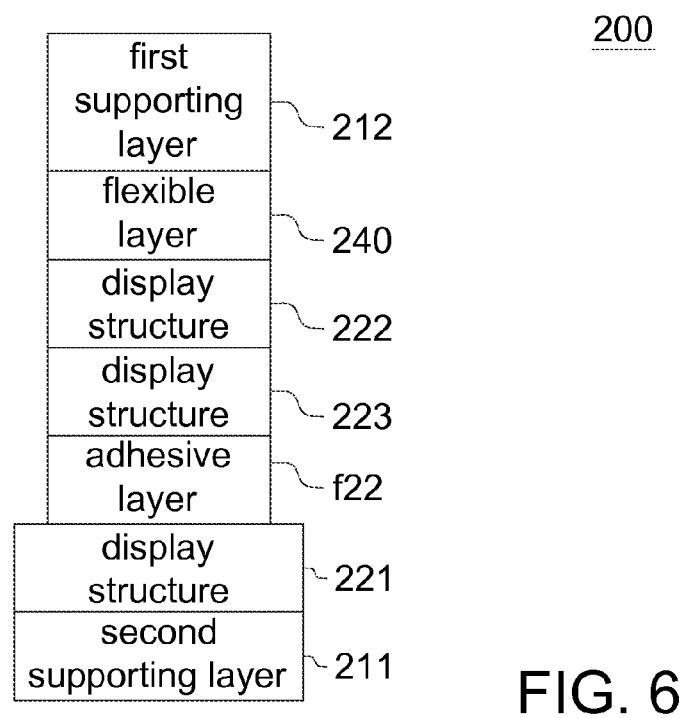
FIG. 6 shows a display according to a second embodiment of the invention.

Referring to FIG. 6, a display according to a second embodiment of the invention is shown. In comparison to the display 100 of the first embodiment, the display 200 of the present embodiment of the invention further includes a display structure 223. In terms of relative positions, a second supporting layer 211, a display structure 221, an adhesive layer f22, a display structure 223, a display structure 222, a flexible layer 240 and a first supporting layer 212 are sequentially staked together. Moreover, in terms of element types, the second supporting layer 211 can be, for example, formed by metal, glass, reinforced glass or plastic, and the first supporting layer 212 can be, for example, formed by plastic, glass or reinforced glass. Besides, the display structure 221, the display structure 223 and the display structure 222 can be realized by active/passive elements, an electrophoretic display and a color photoresist layer, respectively.

Figure 7:
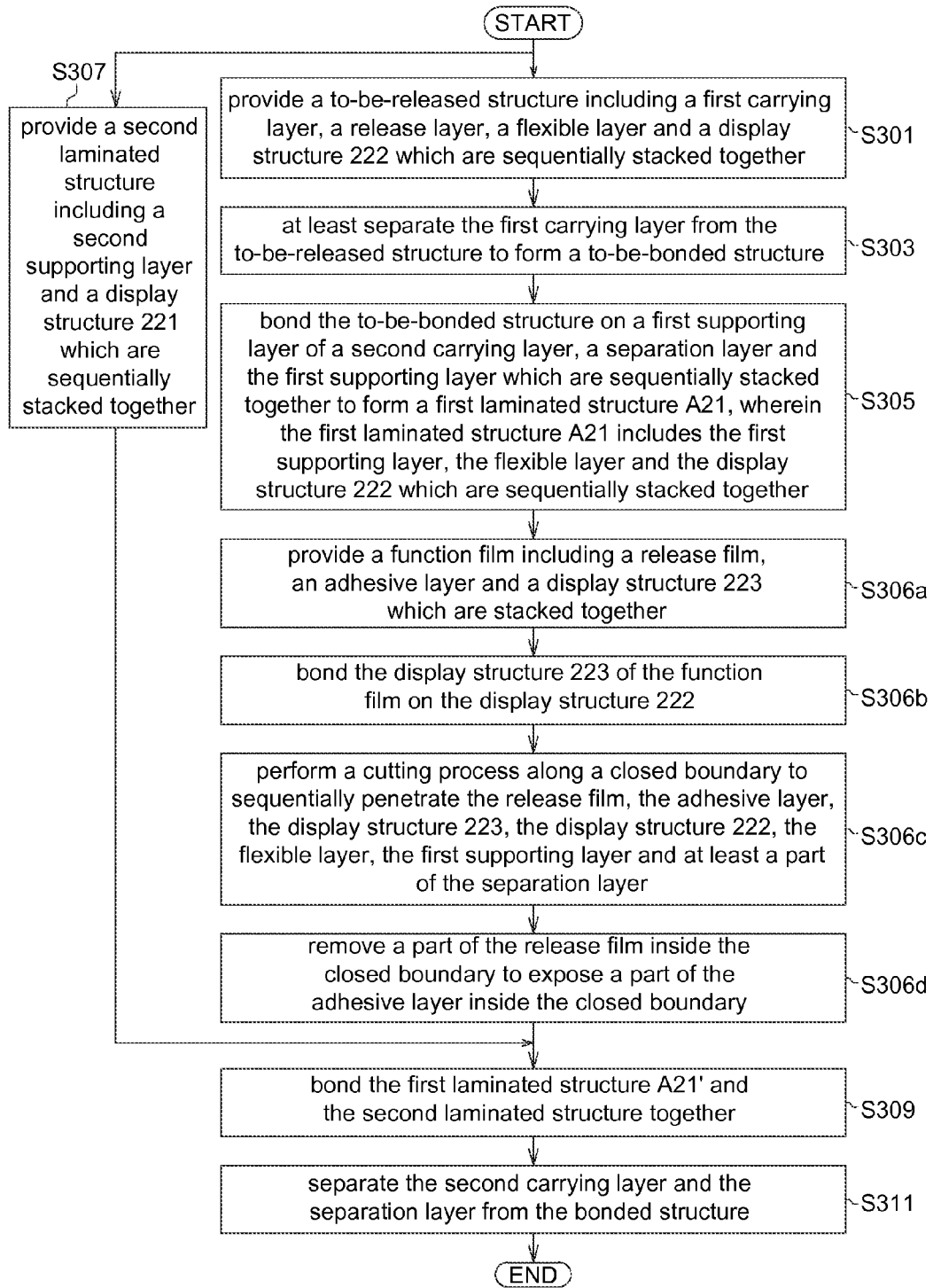
FIG. 7 shows a flowchart of a method for manufacturing the display according to the second embodiment of the invention.

Referring to FIG. 7 and FIGS. 8A~8H, a flowchart of a method for manufacturing the display according to the second embodiment of the invention is shown in FIG. 7, and processes of the method for manufacturing the display according to the second embodiment of the invention are shown in FIGS. 8A~8H. Steps S301~S305 in FIG. 7 are similar to steps S101~S105 in FIG. 1. That is, steps S101~S105 in FIG. 1 are used for manufacturing the upper structure of the display 200 of the present embodiment of the invention.

In comparison to the manufacturing method of the display 100 of the first embodiment, since the electro-phoretic display is a board structure, the electro-phoretic display (the display structure 223) of the present embodiment of the invention is first formed in the upper structure of the display 200 through steps S301~S306d.

Figure 8A:
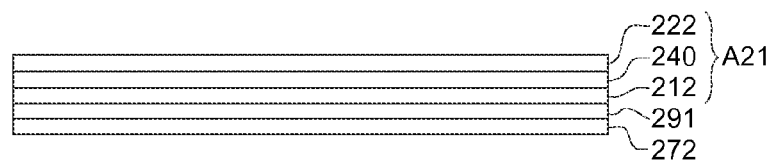
FIGS. 8A~8H are processes of the method for manufacturing the display according to the second embodiment of the invention.

Steps S301~S305 in FIG. 7 are similar to steps S201~S205 in FIG. 2, and the similarities are not repeatedly described herein. The structure manufactured according to steps S301~S305 in FIG. 7 is illustrated in FIG. 8A. The structure illustrated in FIG. 8A includes a second carrying layer 272, a separation layer 291, the first supporting layer 212, the flexible layer 240 and the display structure 222 which are sequentially stacked together. The first laminated structure A21 includes the first supporting layer 212, the flexible layer 240 and the display structure 222 which are sequentially stacked together.

Figure 8B:
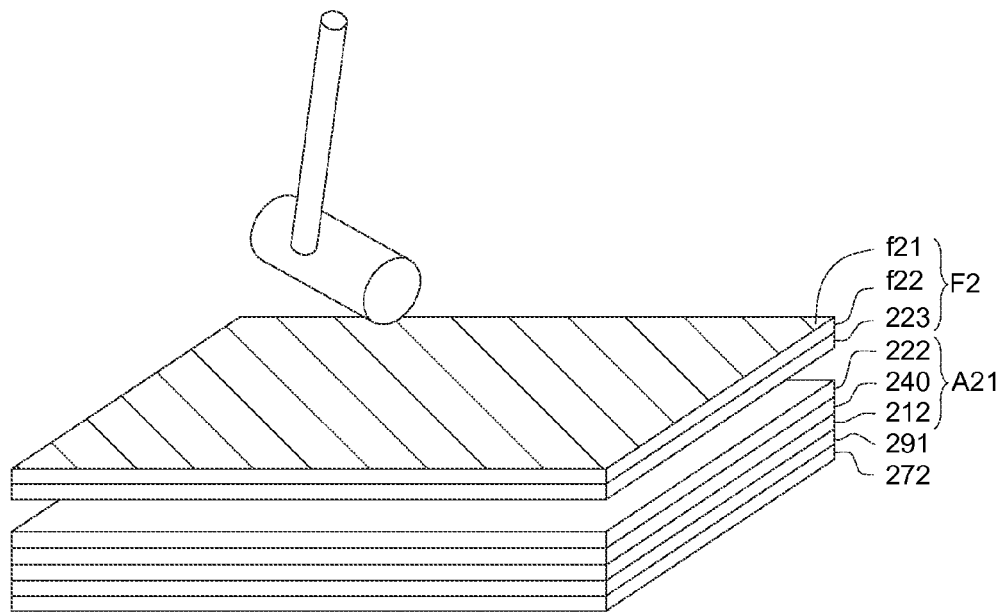

Then, in step S306a, a function film F2 is provided, as indicated in FIG. 8B. The function film F2 includes a release film f21, the adhesive layer f22 and the display structure 223 which are stacked together.

Figure 8C:
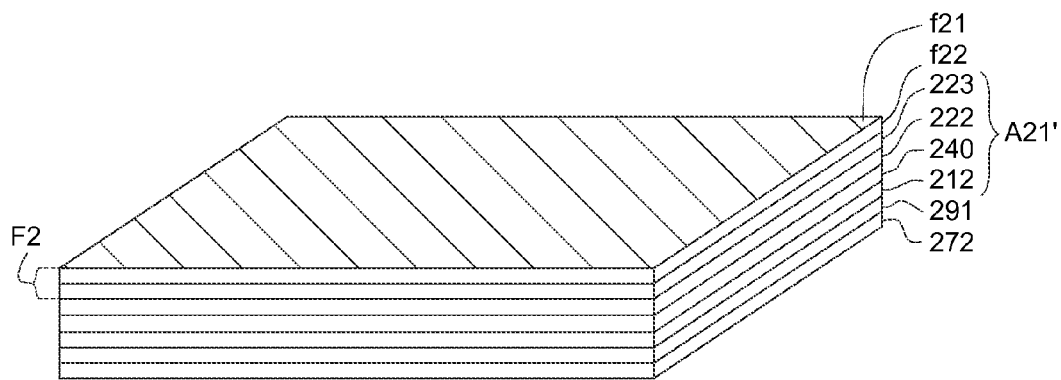

Then, in step S306b, the display structure 223 of the function film F2 is bonded on the display structure 222, so that the first laminated structure A21' further includes the display structure 223, as indicated in FIG. 8C.

Figure 8D:
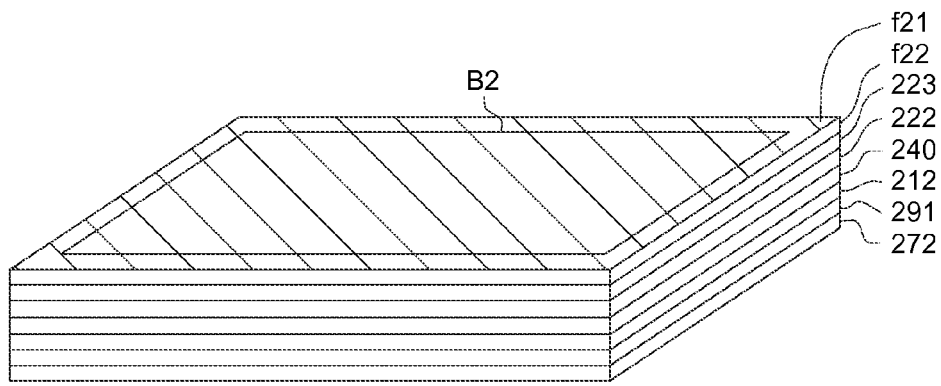

Then, in step S306c, a cutting process is performed on structure shown in FIG. 8C along a closed boundary B2 so as to sequentially penetrate the release film f21, the adhesive layer f22, the display structure 223, the display structure 222, the flexible layer 240, the first supporting layer 212 and at least a part of the separation layer 291, as indicated in FIG. 8D.

Figure 8E:
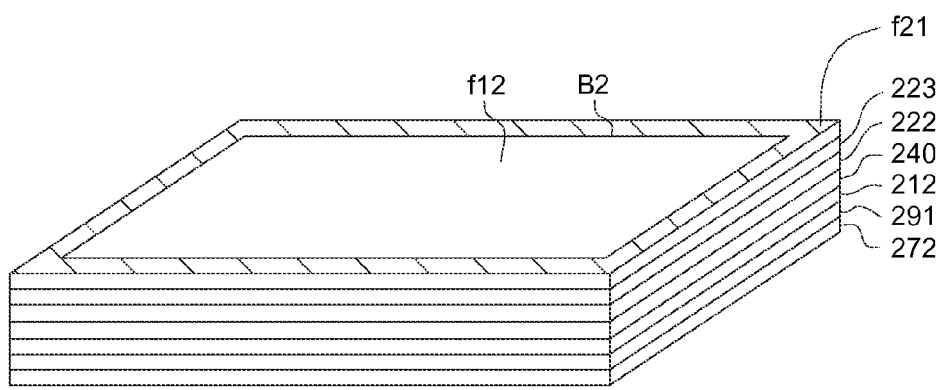

Then, in step S306d, a part of the release film f21 inside the closed boundary B2 is removed to expose a part of the adhesive layer f22 inside the closed boundary B2, as indicated in FIG. 8E.

Figure 8F:
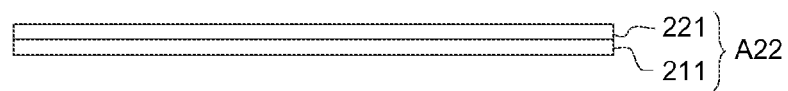

Then, in step S307, a second laminated structure A22 is provided, as indicated in FIG. 8F. The second laminated structure A22 includes the second supporting layer 211 and the display structure 221 which are sequentially stacked together.

Figure 8G:
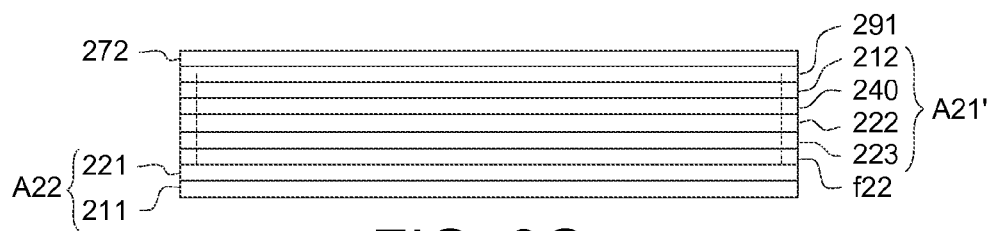

Then, in step S309, the first laminated structure A21' and the second laminated structure A22 are bonded together, as indicated in FIG. 8G. The first laminated structure A21' is bonded on the second laminated structure A22 through the exposed part of the adhesive layer f22 to avoid the traces distributed on the peripheral of the second laminated structure A22 being damaged when adhered by the adhesive layer f22.

Figure 8H:

Then, in step S311, the second carrying layer 272 and the separation layer 291 are separated from the bonded structure to complete the display 200, as indicated in FIG. 8H.

The steps of the manufacturing method of the display 200 of the present embodiment of the invention that are similar to those of the display 100 of the first embodiment are performed in a similar manner, so that the advantages of the first embodiment can be obtained, and the similarities are not repeatedly described herein. Furthermore, the display 200 of the present embodiment of the invention can be formed with a protection layer so as to obtain similar advantages possessed by the display 100 of the first embodiment.

Third Embodiment

Figure 9:
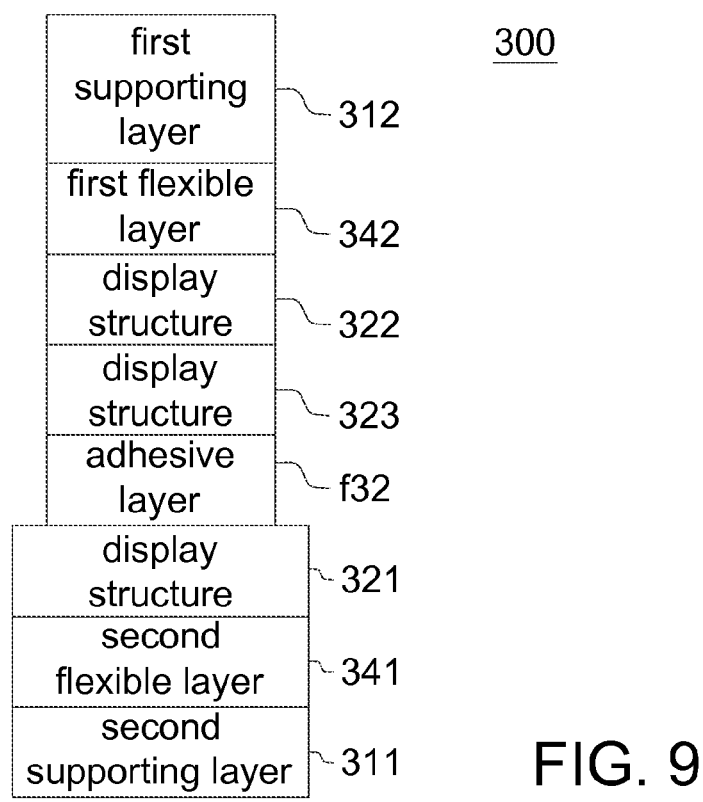
FIG. 9 shows a display according to a third embodiment of the invention.

Referring to FIG. 9, a display according to a third embodiment of the invention is shown. In comparison to the display 200 of the second embodiment, the display 300 of the present embodiment of the invention further includes a first flexible layer 342 and a second flexible layer 341. In terms of relative positions, a second supporting layer 311, the second flexible layer 341, a display structure 321, an adhesive layer f32, a display structure 323, a display structure 322, the first flexible layer 342 and a first supporting layer 312 are sequentially staked together. Moreover, in terms of element types, the second supporting layer 311 can be, for example, formed by metal, glass, reinforced glass or plastic, and the first supporting layer 312 can be, for example, realized by plastic, glass or reinforced glass. Besides, the display structure 321, the display structure 323 and display structure 322 can be, for example, realized by active/passive elements, an electro-phoretic display and a color photoresist layer, respectively.

The display 300 of the present embodiment of the invention can be manufactured according to steps similar to those in FIG. 7 except that step S307 in FIG. 7 is replaced by a step of providing a second laminated structure A32, wherein the second laminated structure A32 includes the second supporting layer 311, the second flexible layer 341 and the display structure 321 which are sequentially stacked together. That is, in comparison to the second laminated structure A22 provided in step S307 in FIG. 7, the second laminated structure A32 provided in the corresponding step of the present embodiment of the invention further includes the second flexible layer 341.

Figure 10:
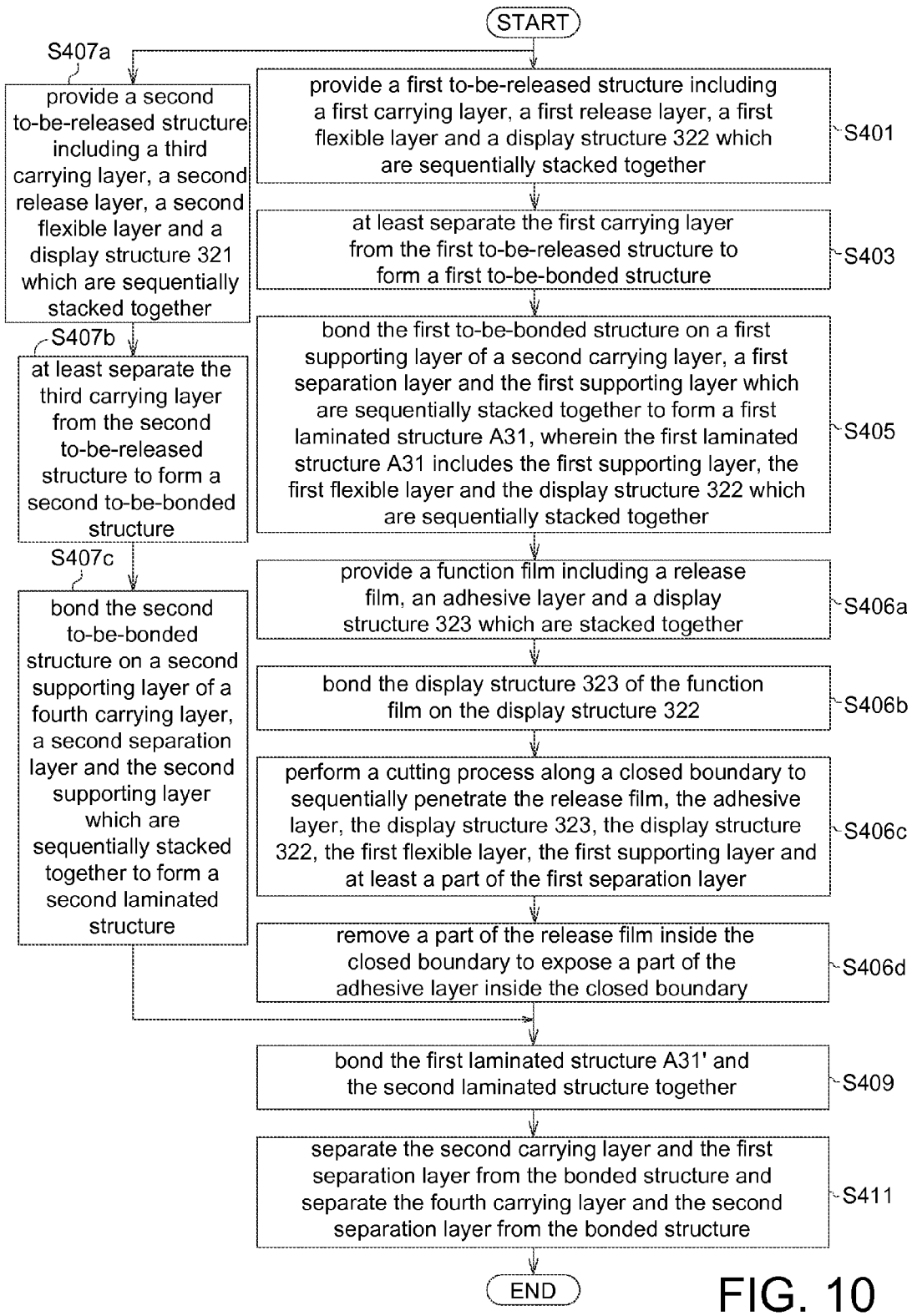
FIG. 10 shows a flowchart of a method for manufacturing the display according to the third embodiment of the invention.

Alternatively, the display 300 can also be manufactured according to steps in FIG. 10. Referring to FIG. 10 and FIGS. 11A~11F, a flowchart of a method for manufacturing the display according to the third embodiment of the invention is shown in FIG. 10, and partial processes of the method for manufacturing the display according to the third embodiment of the invention are shown in FIGS. 11A~11F. Steps S401~S405 in FIG. 10 are similar to steps S101~S105 in FIG. 1, and steps S407a~S407c in FIG. 10 are also similar to steps S101~S105 in FIG. 1. That is, steps S101~S105 in FIG. 1 are used for manufacturing the upper structure and the lower structure of the display 300 of the present embodiment of the invention.

In comparison to the manufacturing method of the display 100 of the first embodiment, since the electro-phoretic display is a board structure, the electro-phoretic display (the display structure 323) of the present embodiment of the invention is first formed in the upper structure of the display 300 through steps S401~S406d.

Figure 11A:
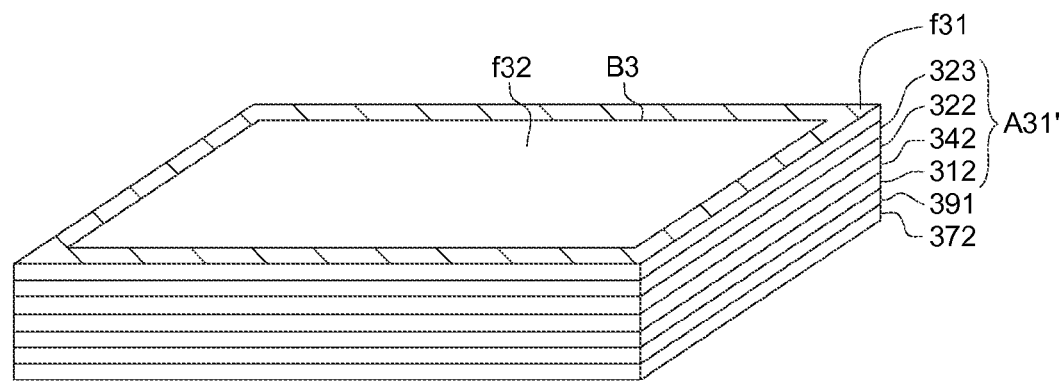
FIGS. 11A~11F are partial processes of the method for manufacturing the display according to the third embodiment of the invention.

Steps S401-S406d in FIG. 10 are similar to steps S301-S306d in FIG. 7, and the similarities are not repeatedly described herein. The structure manufactured according to steps S401-S406d in FIG. 10 is illustrated in FIG. 11A. The structure in FIG. 11A includes a second carrying layer 372, a first separation layer 391, the first supporting layer 312, the first flexible layer 342, the display structure 322, the display structure 323, the adhesive layer f32 and a release film f31 which are sequentially stacked together. A part of the release film f31 inside a closed boundary B3 is removed to expose a part of the adhesive layer f32 inside the closed boundary B3. In step S405, a first laminated structure A31 includes the first supporting layer 312, the first flexible layer 342 and the display structure 322 which are sequentially stacked together. Besides, after step S406b, a first laminated structure A31' further includes the display structure 323.

Figure 11B:
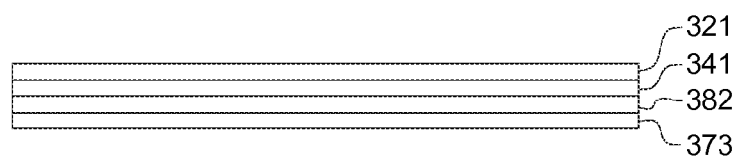

Then, in step S407a, a second to-be-released structure is provided, as indicated in FIG. 11B. The second to-be-released structure includes a third carrying layer 373, a release layer 382, the second flexible layer 341 and the display structure 321 which are sequentially stacked together.

Figure 11C:
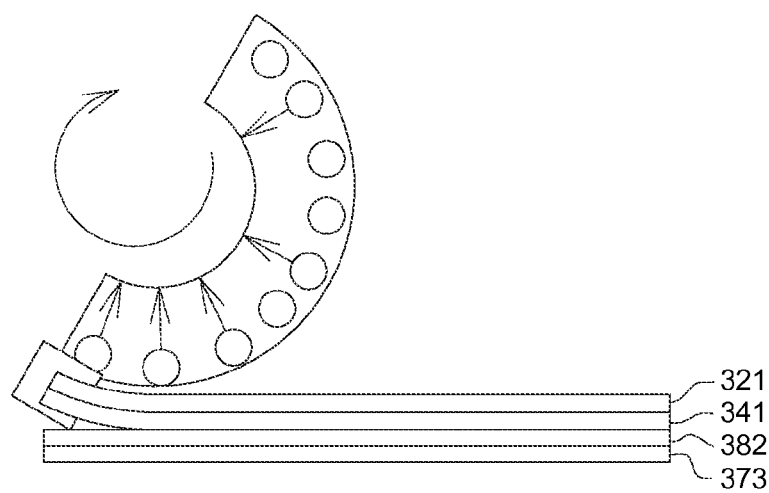

Then, in step S407b, at least the third carrying layer 373 is separated from the second to-be-released structure in FIG. 11B, as indicated in FIG. 11C. The present embodiment is exemplified by the arrangement that the third carrying layer 373 and the second release layer 382 are separated from the second to-be-released structure, so the second to-be-bonded structure includes the display structure 321 and the second flexible layer 341.

Figure 11D:
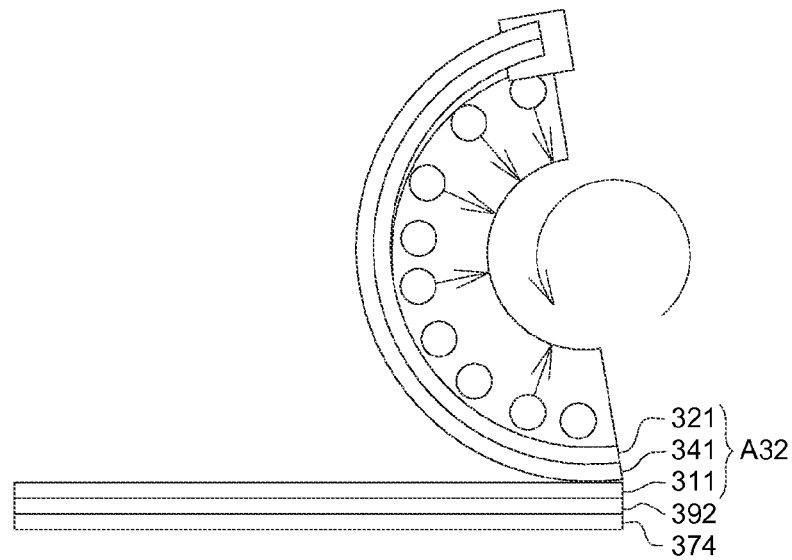

Then, in step S407c, the second to-be-bonded structure is bonded on the second supporting layer 311 of a fourth carrying layer 374, a second separation layer 392 and the second supporting layer 311 which are sequentially stacked together to form the second laminated structure A32, as indicated in FIG. 11D. The second laminated structure A32 includes the second supporting layer 311, the second flexible layer 341 and the display structure 321 which are sequentially stacked together.

Figure 11E:
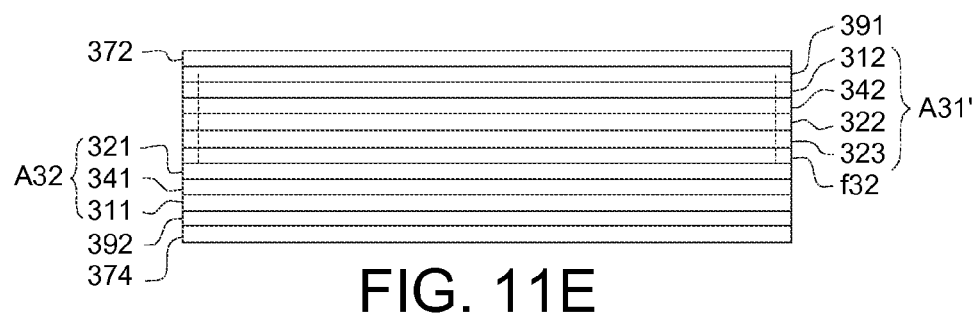
Figure 11F:
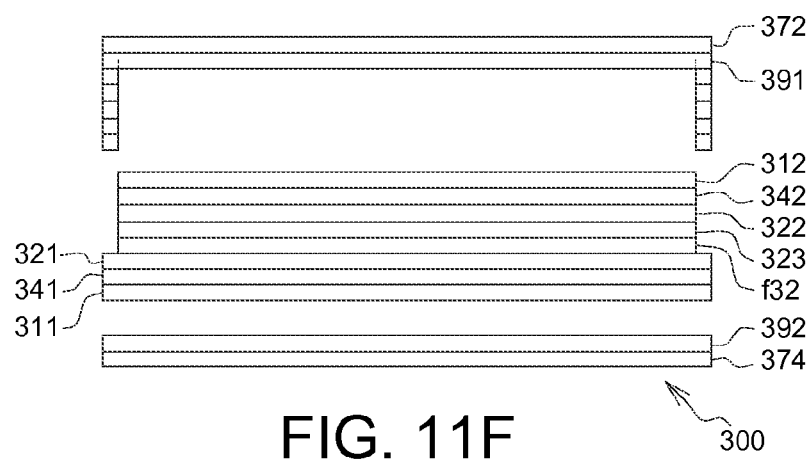

Then, in step S409, the first laminated structure A31' and the second laminated structure A32 are bonded together, as indicated in FIG. 11E. The first laminated structure A31' is bonded on the second laminated structure A32 through the exposed part of the adhesive layer f32 to avoid the traces distributed on the peripheral of the second laminated structure A32 being damaged when adhered by the adhesive layer f32

Then, in step S411, the second carrying layer 372 and the first separation layer 391 are separated from the bonded structure, and the fourth carrying layer 374 and the second separation layer 392 are separated from the bonded structure to form the display 300.

The display 300 of the present embodiment of the invention can also be formed with a protection layer so as to obtain similar advantages possessed by the display 100 of the first embodiment.

Fourth Embodiment

Figure 12:
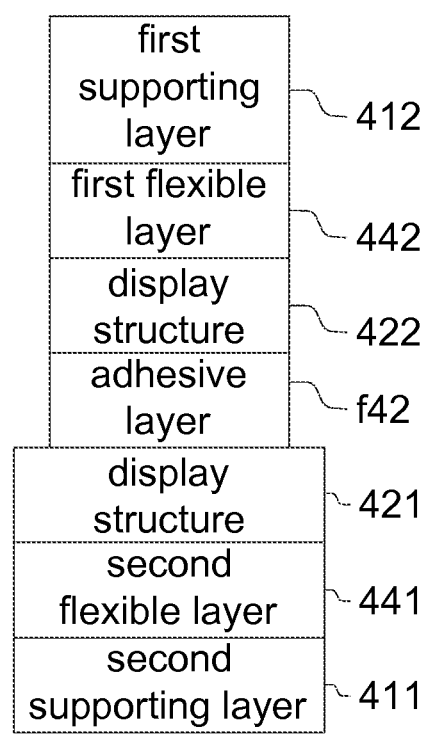
FIG. 12 shows a display according to a fourth embodiment of the invention.

Referring to FIG. 12, a display according to a fourth embodiment of the invention is shown. The display 400 of the present embodiment of the invention includes a second supporting layer 411, a second flexible layer 441, a display structure 421, an adhesive layer f42, a display structure 422, a first flexible layer 442 and a first supporting layer 412 which are sequentially stacked together.

In the present embodiment of the invention, the second supporting layer 411 can be, for example, formed by metal, glass, reinforced glass or plastic, and the first supporting layer 412 can be, for example, formed by plastic, glass or reinforced glass. The display structure 422 can be, for example, realized by a color photoresist layer. Furthermore, the display structure 421 can be realized by a structure including an organic light emitting diode and several active/passive elements or a structure including an electro-phoretic display and several active/passive elements.

Regardless the display structure 421 is a structure including an organic light emitting diode and several active/passive elements or a structure including an electro-phoretic display and several active/passive elements, the display 400 of the present embodiment of the invention can be manufactured according to the following two methods.

Figure 13:
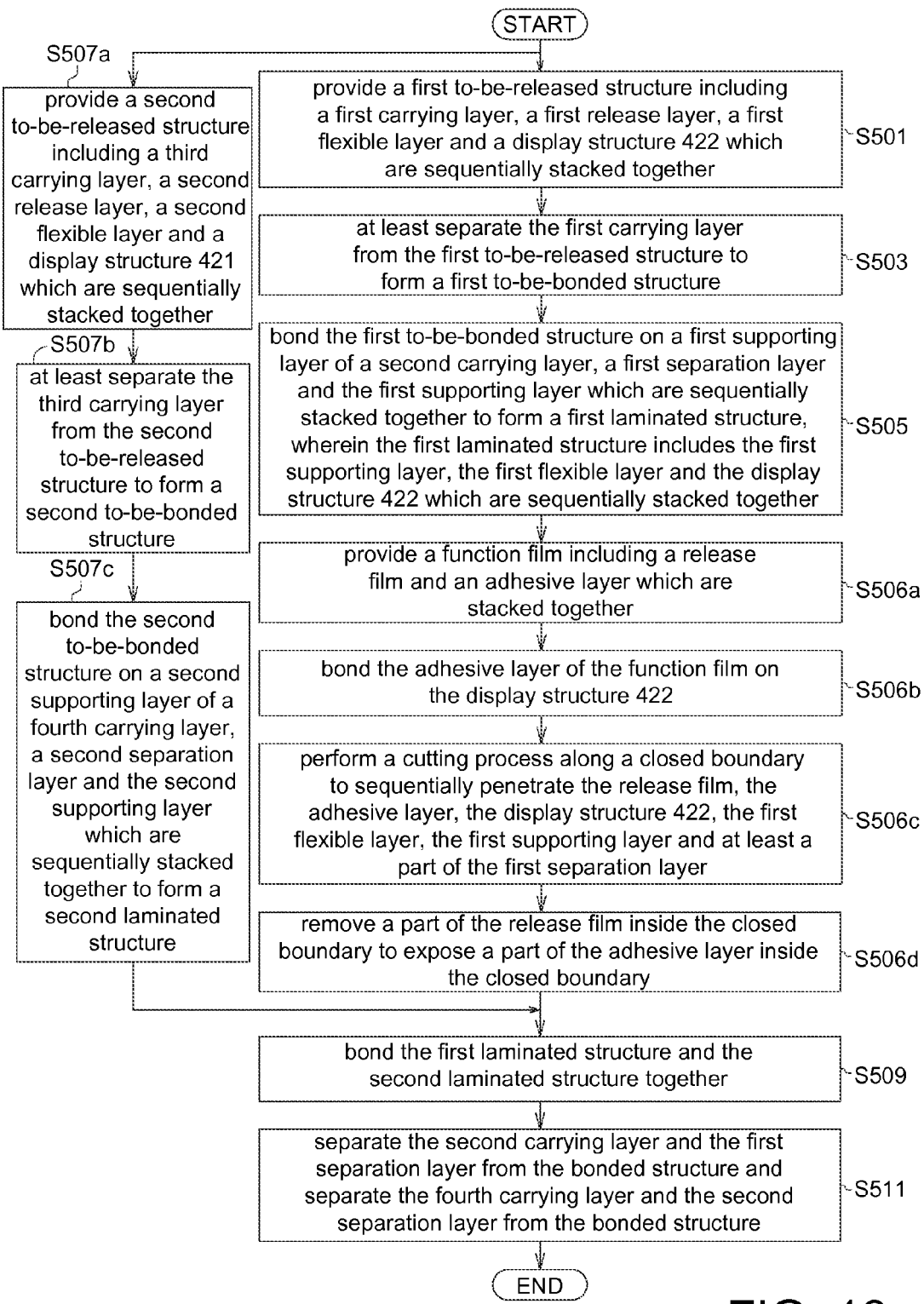
FIG. 13 shows a flowchart of a method for manufacturing the display according to the fourth embodiment of the invention.

Referring to FIG. 13 and FIGS. 14A~14D, a flowchart of a method for manufacturing the display according to the fourth embodiment of the invention is shown in FIG. 13, and partial processes of the method for manufacturing the display according to the fourth embodiment of the invention are shown in FIGS. 14A~14D. Steps S501~S505 in FIG. 13 are similar to steps S101~S105 in FIG. 1, and steps S507a~S507c in FIG. 13 are also similar to steps S101~S105 in FIG. 1. That is, steps S101~S105 in FIG. 1 are used for manufacturing the upper structure and the lower structure of the display 400 of the present embodiment of the invention.

Figure 14A:
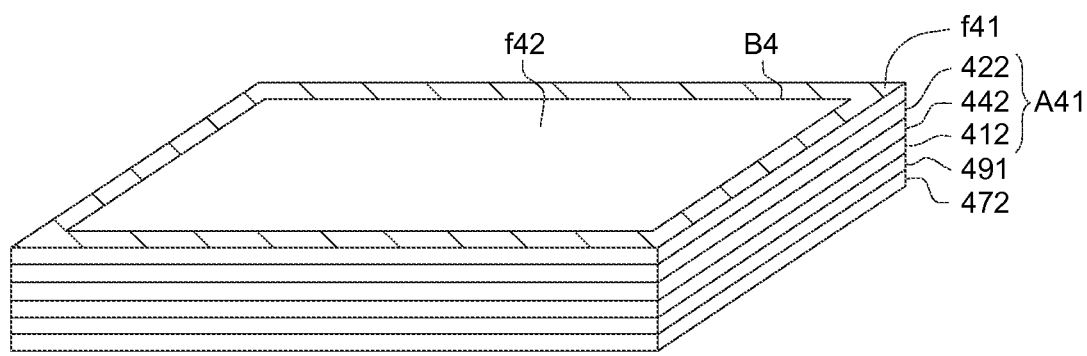
FIGS. 14A~14D are partial processes of the method for manufacturing the display according to the fourth embodiment of the invention.

Steps S501~S506d in FIG. 13 are similar to steps S301~S306d in FIG. 4, and the similarities are not repeatedly described herein. The structure manufactured according to steps S501~S506d in FIG. 13 is illustrated in FIG. 14A. The structure in FIG. 14A includes a second carrying layer 472, a first separation layer 491, the first supporting layer 412, the first flexible layer 442, the display structure 422, the adhesive layer f42 and a release film f41 which are sequentially stacked together. A part of the release film f41 inside a closed boundary B4 is removed to expose a part of the adhesive layer f42 inside the closed boundary B4. A first laminated structure A41 includes the first supporting layer 412, the first flexible layer 442 and the display structure 422 which are sequentially stacked together.

Figure 14B:
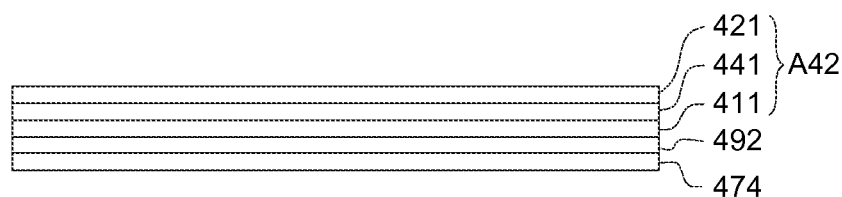

Steps S507a~S507c in FIG. 13 are similar to steps S407a~S407c in FIG. 10, and the similarities are not repeatedly described herein. The structure manufactured according to steps S507a~S507c in FIG. 13 is illustrated in FIG. 14B. The structure in FIG. 14B includes a fourth carrying layer 474, a second separation layer 492, the second supporting layer 411, the second flexible layer 441 and the display structure 421 which are sequentially stacked together. A second laminated structure A42 includes the second supporting layer 411, the second flexible layer 441 and the display structure 421 which are sequentially stacked together.

Figure 14C:
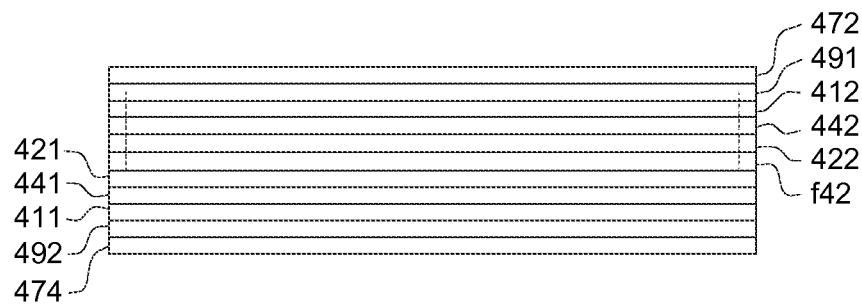

Then, in step S509, the first laminated structure A41 and the second laminated structure A42 are bonded together, as indicated in FIG. 14C. The first laminated structure A41 is bonded on the second laminated structure A42 through the exposed part of the adhesive layer f42 to avoid the traces distributed on the peripheral of the second laminated structure A42 being damaged when adhered by the adhesive layer f42.

Figure 14D:
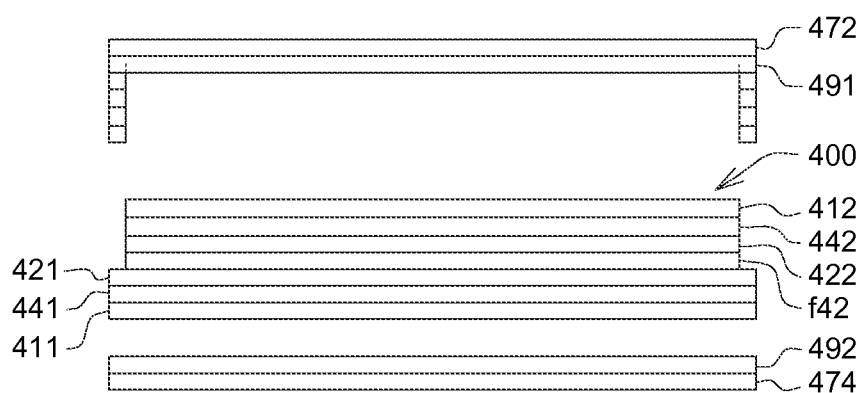

Then, in step S511, the second carrying layer 472 and the first separation layer 491 are separated from the bonded structure, and the fourth carrying layer 474 and the second separation layer 492 are separated from the bonded structure to form the display 400, as indicated in FIG. 14D.

Figure 15:
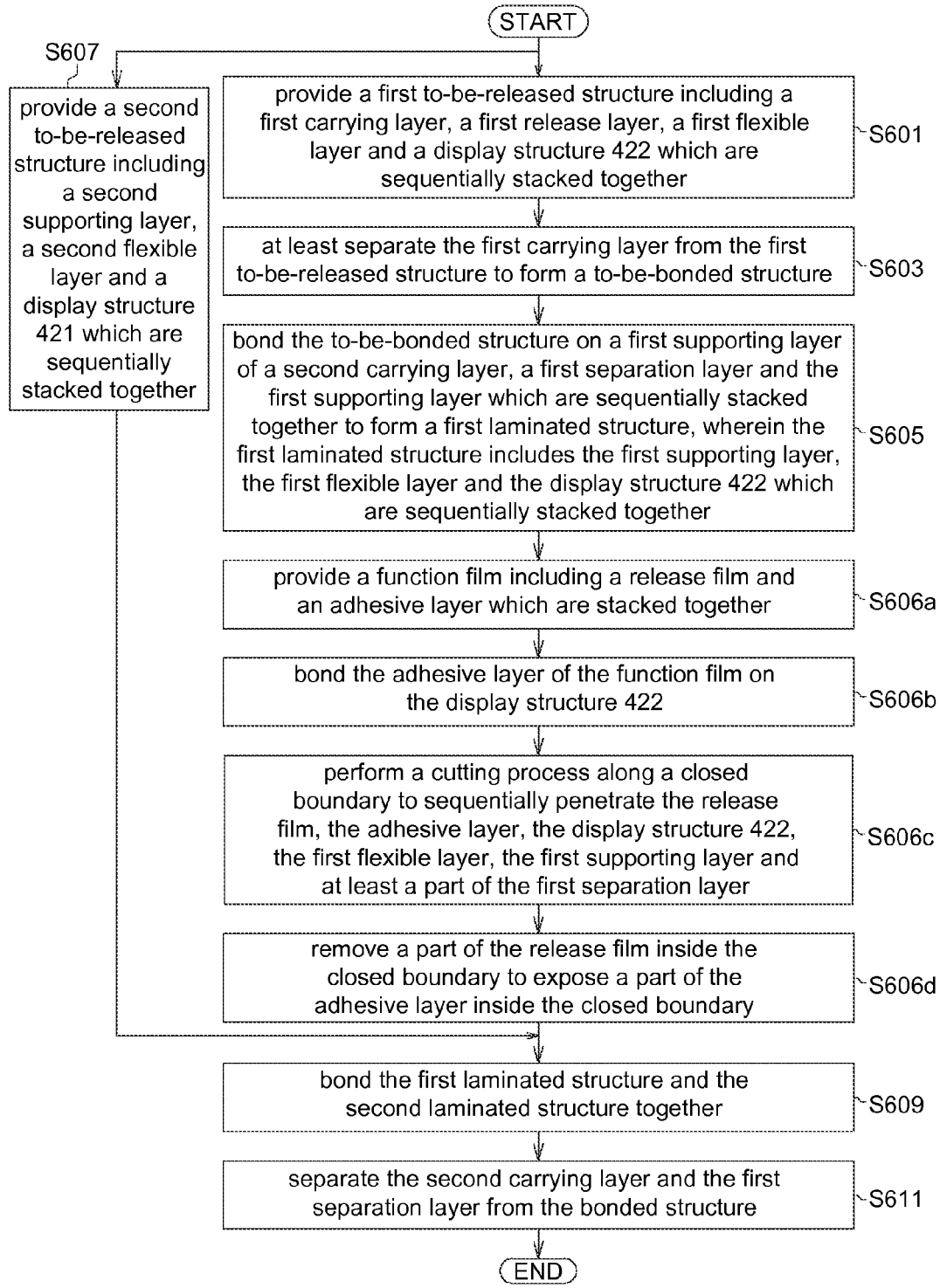
FIG. 15 shows a flowchart of another method for manufacturing the display according to the fourth embodiment of the invention.

Referring to FIG. 15 and FIGS. 16A~16D, a flowchart of another method for manufacturing the display according to the fourth embodiment of the invention is shown in FIG. 15, and partial processes of the another method for manufacturing the display according to the fourth embodiment of the invention are shown in FIGS. 16A~16D.

Figure 16A:
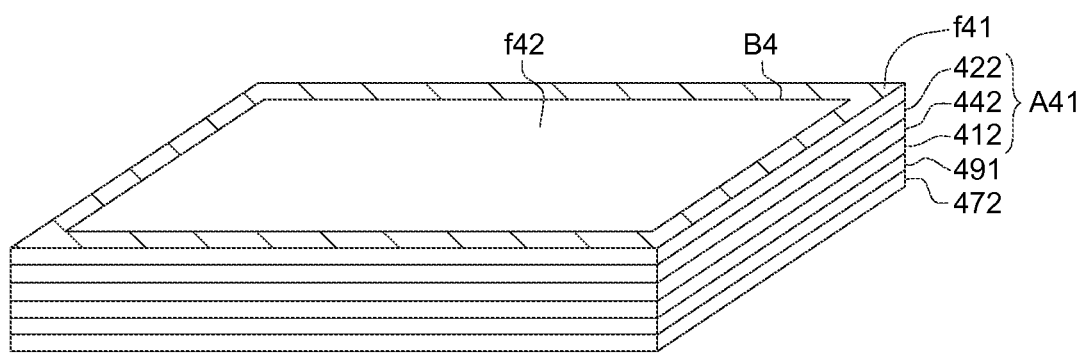
FIGS. 16A~16D are partial processes of the another method for manufacturing the display according to the fourth embodiment of the invention.

Steps S601~S606d in FIG. 15 are similar to steps S501~S506d in FIG. 13, and the similarities are not repeatedly described herein. The structure manufactured according to steps S601~S606d in FIG. 15 is illustrated in FIG. 16A. The structure in FIG. 16A includes the second carrying layer 472, the first separation layer 491, the first supporting layer 412, the first flexible layer 442 and the display structure 422, the adhesive layer f42 and the release film f41 which are sequentially stacked together. The part of the release film f41 inside the closed boundary B4 is removed to expose the part of the adhesive layer f42 inside the closed boundary B4. The first laminated structure A41 includes the first supporting layer 412, the first flexible layer 442 and the display structure 422 which are sequentially stacked together.

Figure 16B:
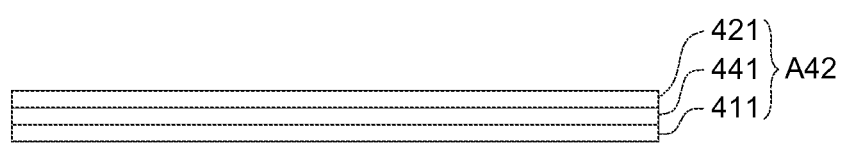

Then, in step S607, the second laminated structure A42 is provided, as indicated in FIG. 16B. The second laminated structure A42 includes the second supporting layer 411, the second flexible layer 441 and the display structure 421 which are sequentially stacked together.

Figure 16C:
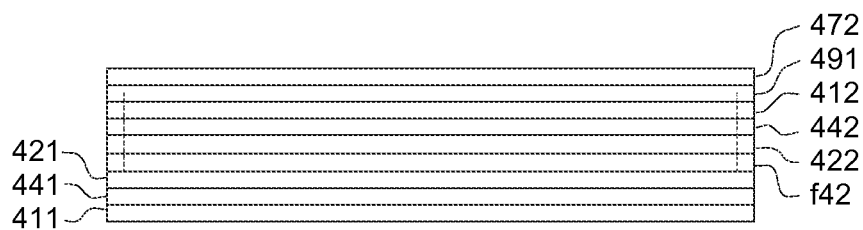

Then, in step S609, the first laminated structure A41 and the second laminated structure A42 are bonded together, as indicated in FIG. 16C. The first laminated structure A41 is bonded on the second laminated structure A42 through the exposed part of the adhesive layer f42 to avoid the traces distributed on the peripheral of the second laminated structure A42 being damaged when adhered by the adhesive layer f42.

Figure 16D:
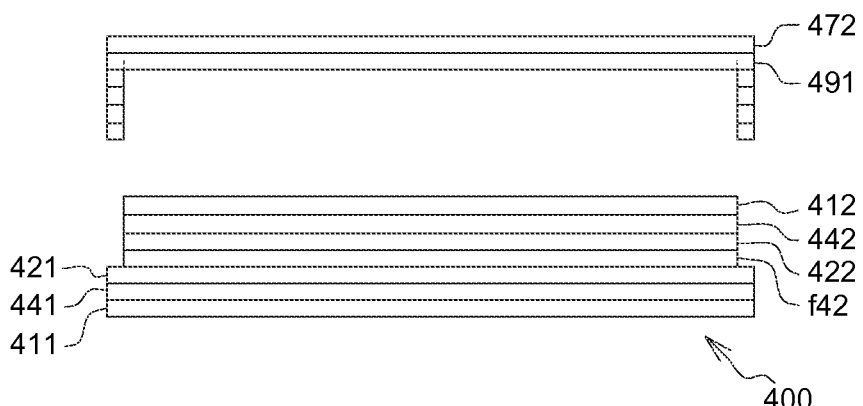

Then, in step S611, the second carrying layer 472 and the first separation layer 491 are separated from the bonded structure to form the display 400, as indicated in FIG. 16D.

The display 400 of the present embodiment of the invention can also be formed with a protection layer so as to obtain similar advantages possessed by the display 100 of the first embodiment.

Fifth Embodiment

Figure 17A:
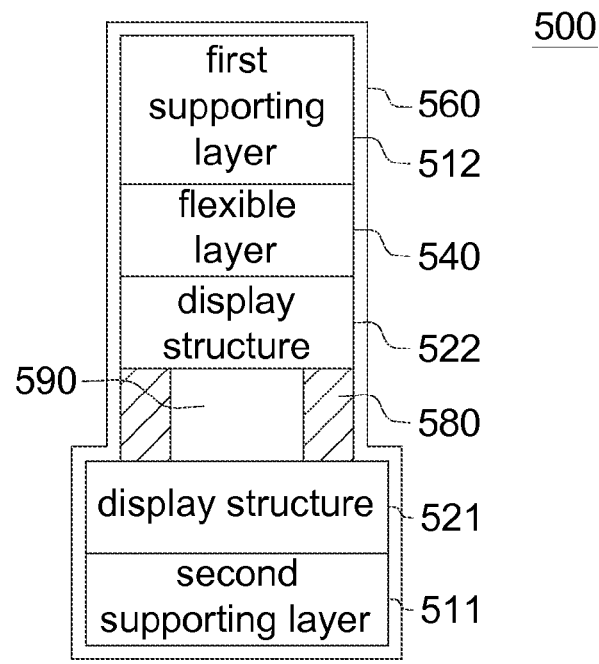
FIG. 17A shows a display according to a fifth embodiment of the invention.

Referring to FIG. 17A, a display according to a fifth embodiment of the invention is shown. In comparison to the display 100 of the first embodiment, the display 500 of the present embodiment of the invention is a liquid crystal display including a second supporting layer 511, a display structure 521, a liquid crystal layer 590, a light-to-heat sealant 580, a display structure 522, a flexible layer 540 and a first supporting layer 512. The liquid crystal layer 590 is disposed between the display structure 522 and the display structure 521. The light-to-heat sealant 580 is disposed between the display structure 522 and the display structure 521, and surrounds the liquid crystal layer 590. The display structure 521 can be realized by active/passive elements, and the display structure 522 can be realized by a color photoresist layer.

The manufacturing method of the display 500 is similar to the manufacturing method of the display 100 of the first embodiment except that the manufacturing method of the display 500 does not include the step of bonding the function film and the other related steps. Moreover, since the display 500 includes the liquid crystal layer 590 and the light-to-heat sealant 580, after the lower structure including the second supporting layer 511 and the display structure 521 is manufactured, the light-to-heat sealant 580 is coated on the display structure 521, and then the liquid crystal layer 590 is formed within the region surrounded by the light-to-heat sealant 580 through the one drop filling (ODF) process. The light-to-heat sealant 580 includes a sealant material and a noble metal material, for example. After the radiation step, the noble metal material transforms heat to light, so that the sealant material is heated to become polymerized and hardened. Thus, the lower structure having the liquid crystal layer 590, the light-to-heat sealant 580, the display structure 521 and the second supporting layer 511 can be assembled with the upper structure including a carrying layer (not illustrated), a separation layer (not illustrated), the first supporting layer 512, the flexible layer 540 and the display structure 522. Therefore, the display 500 is formed after the carrying layer and the separation layer are separated from the bonded structure and the protection layer 560 is formed.

In general, a sealant is hardened through a heating process at the temperature of 120° C. However, during the heating process, the semi-product of a display is placed on a heating platform, so that a substrate of the semi-product is easily deformed due to high temperature. Consequently, the substrate might cause alignment error to further result in light leakage. Furthermore, high temperature might cause the substrate, the photoresist or the sealant to generate pollutants which contaminate the liquid crystal. Therefore, the occurrence of image stick is increased when the contaminated liquid crystal displays an image. In the present embodiment of the invention, since the light-to-heat sealant 580 is hardened by the heat generated from the radiation of the light on the peripheral of the light-to-heat sealant 580, the situation of substrate deformation and liquid crystal pollution of the display 500 due to high temperature can be avoided.

Figure 17B:
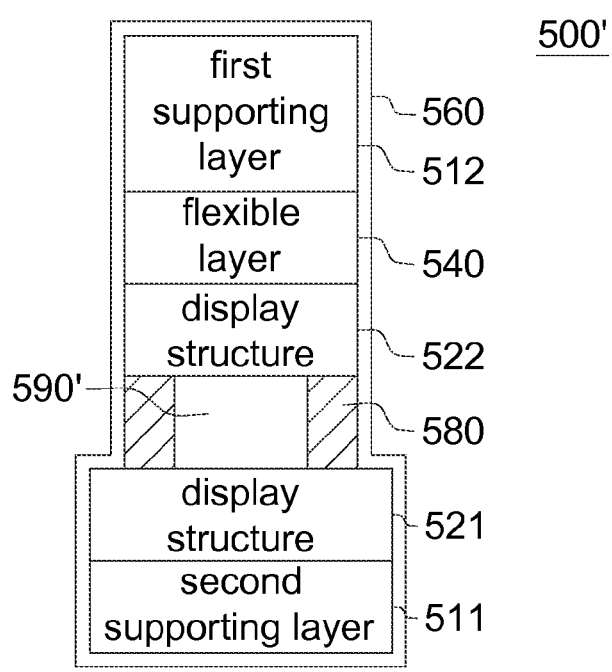
FIG. 17B shows another display according to the fifth embodiment of the invention.

Anyone who is skilled in the technology of the invention will understand that the light-to-heat sealant 580 of the present embodiment of the invention can also be used in displays with other types or structures. Referring to FIG. 17B, another display according to the fifth embodiment of the invention is shown. In comparison to the display 500 in FIG. 17A, the display 500' in FIG. 17B is an organic light emitting diode (OLED) display including the second supporting layer 511, the display structure 521, a display structure 590', the light-to-heat sealant 580, the display structure 522, the flexible layer 540 and the first supporting layer 512. The display structure 590' is disposed between the display structure 522 and the display structure 521. The light-to-heat sealant 580 is disposed between the display structure 522 and the display structure 521, and surrounds the display structure 590'. The display structure 521 can be realized by active/passive elements, the display structure 590' can be realized by an OLED, and the display structure 522 can be realized by a color photoresist layer. Thus, the light-to-heat sealant 580 can provide water/oxygen resistance. Unlike the sequence in the formation of the liquid crystal layer 590 and the light-to-heat sealant 580 of the display 500, in the manufacturing process of the display 500', the display structure 590' is formed prior to the formation of the light-to-heat sealant 580.

In the present embodiment of the invention, the light-to-heat sealant 580 is disposed surrounding the liquid crystal layer 590 and the display structure 590'. However, in other embodiments, the liquid crystal layer 590 and the display structure 590' can be surrounded by thermosensitive sealant or photosensitive sealant, for example.

In the aforementioned embodiments, the manufacturing method is for manufacturing one single display. However, anyone who is skilled in the technology of the invention will understand that the processes of the above embodiments can also be used for manufacturing a large-sized structure, and multiple displays can be formed through a cutting process (such as step S206c, step S306c, step S406c, step S506c and step S606c of the aforementioned embodiments).

Figure 18:
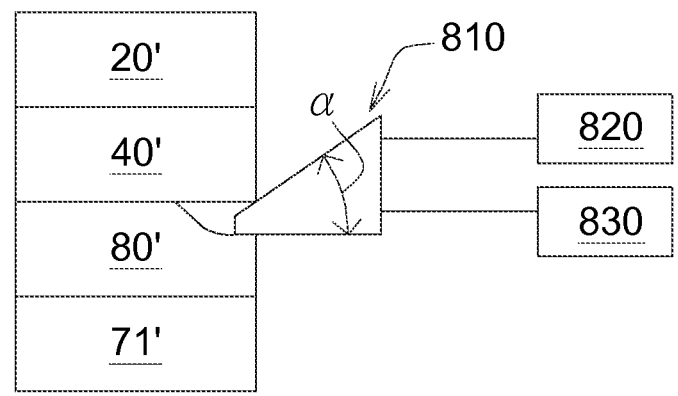
FIG. 18 shows a wedged shovel according to an embodiment of the invention.

In the aforementioned embodiments, the carrying layer and the release layer are separated from the to-be-released structure by using a release adhesive mechanism. However, the method of separating the carrying layer and the release layer from the structure is not limited to the above exemplification. In an embodiment, a low temperature (<10° C.). wedged shovel is shoveled into the release layer to reduce the adhesion of the release layer, so that the carrying layer and the release layer can be separated from the to-be-released structure. In an embodiment, the first release layer can be shoveled by using an air separation device, or by a scratch device to separate the first carrying layer. Referring to FIG. 18, a wedged shovel according to an embodiment of the invention is shown. The to-be-released structure includes a display structure 20', a flexible layer 40', a release layer 80' and a carrying layer 71'. The front end of the wedged shovel 810 has a bevel a for shoveling into the release layer 80'. The rear end of the wedged shovel 810 has a loop temperature control system 820 which provides a low temperature fluid for maintaining the wedged shovel 810 at a low temperature state. Besides, the wedged shovel 810 further has a condensed-water removal equipment 830 to avoid the residue of condensed water which may damage the structure. Thus, the step of separating the carrying layer 71' and the release layer 80' from the to-be-released structure does not require any freezer, so that the semi-product (the to-be-released structure) does not need to leave the production line, and the situation that the residue of condensed water which generates when the freezer is used is improved.

According to the display and the method for manufacturing the same disclosed in the above embodiments of the invention, through the disposition of the carrying layer in the manufacturing process, the upper structure and the lower structure are assembled with higher alignment accuracy and the yield rate of the product is thus increased. Moreover, the disposition of the supporting layer increases the stiffness of the display, so that the display which is capable of slightly bending is drop-resisting. In an embodiment, since the light-to-heat sealant is hardened by the heat generated from the radiation of the light, the situation of substrate deformation and liquid crystal pollution of the display due to high temperature can be avoided. In another embodiment, the disposition of the protection layer effectively prevents the display from being deformed or scratched and increases the water/oxygen resistance of the display so as to enhance the durability of the display.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manufacturing a display, comprising:
   providing a first to-be-released structure, wherein the first to-be-released structure comprises a first carrying layer, a first release layer, a first flexible layer and a first display structure which are sequentially stacked together;
   at least separating the first carrying layer from the first to-be-released structure to form a first to-be-bonded structure;
   bonding the first to-be-bonded structure on a first supporting layer of a second carrying layer, a first separation layer and the first supporting layer which are sequentially stacked together to form a first laminated structure, wherein the first laminated structure at least comprises the first supporting layer, the first flexible layer and the first display structure which are sequentially stacked together;
   providing a second laminated structure, wherein the second laminated structure at least comprises a second supporting layer and a second display structure which are sequentially stacked together; and
   bonding the first laminated structure and the second laminated structure.

2. The method for manufacturing the display according to claim 1, wherein after the step of bonding the first laminated structure and the second laminated structure, the method for manufacturing the display further comprises:
   separating the second carrying layer and the first separation layer from the bonded structure.

3. The method for manufacturing the display according to claim 1, wherein before the step of bonding the first laminated structure and the second laminated structure, the method for manufacturing the display further comprises:
   bonding a third display structure on the first display structure, so that the first laminated structure further comprises the third display structure.

4. The method for manufacturing the display according to claim 3, wherein the step of bonding the third display structure comprises:
   providing a function film, wherein the function film comprises a release film, an adhesive layer and the third display structure which are stacked together; and
   bonding the third display structure of the function film on the first display structure.

5. The method for manufacturing the display according to claim 4, wherein in the step of providing the second laminated structure, the second laminated structure further comprises a second flexible layer located between the second supporting layer and the second display structure.

6. The method for manufacturing the display according to claim 4, wherein the step of providing the second laminated structure comprises:
   providing a second to-be-released structure, wherein the second to-be-release structure comprises a third carrying layer, a second release layer, a second flexible layer and the second display structure which are sequentially stacked together;
   at least separating the third carrying layer from the second to-be-released structure to form a second to-be-bonded structure; and
   bonding the second to-be-bonded structure on the second supporting layer of a fourth carrying layer, a second separation layer and the second supporting layer which are sequentially stacked together to form the second laminated structure.

7. The method for manufacturing the display according to claim 6, wherein after the step of bonding the first laminated structure and the second laminated structure, the method for manufacturing the display further comprises:
   separating the fourth carrying layer and the second separation layer from the bonded structure.

8. The method for manufacturing the display according to claim 6, wherein before the step of bonding the first laminated structure and the second laminated structure, the method for manufacturing the display further comprises:
   bonding a third display structure on the first display structure, so that the first laminated structure further comprises the third display structure.

9. The method for manufacturing the display according to claim 8, wherein the step of bonding the third display structure comprises:
   providing a function film, wherein the function film comprises a release film, an adhesive layer and the third display structure which are stacked together; and
   bonding the third display structure of the function film on the first display structure.

* * * * *